United States Patent [19]

Ganoung

[11] Patent Number: 4,774,858
[45] Date of Patent: Oct. 4, 1988

[54] ENGINE CONTROL APPARATUS FOR IMPROVED FUEL ECONOMY

[76] Inventor: David P. Ganoung, 4406 Chickasaw Rd., Memphis, Tenn. 38117

[21] Appl. No.: 859,431

[22] Filed: May 5, 1986

Related U.S. Application Data

[63] Continuation-in-part of Ser. No. 771,660, Sep. 3, 1985, abandoned, which is a continuation-in-part of Ser. No. 170,017, Jul. 18, 1980, Pat. No. 4,342,298, which is a continuation-in-part of Ser. No. 20,916, Mar. 14, 1979, Pat. No. 4,280,469, which is a continuation-in-part of Ser. No. 767,060, Feb. 9, 1977, abandoned, which is a continuation-in-part of Ser. No. 616,640, Sep. 25, 1975, Pat. No. 4,023,641, said Ser. No. 771,660, is a continuation-in-part of Ser. No. 689,185, Jan. 7, 1985, which is a continuation-in-part of Ser. No. 451,613, Dec. 20, 1982, Pat. No. 4,505,169, which is a continuation-in-part of Ser. No. 205,625, Nov. 10, 1980, Pat. No. 4,383,456, which is a continuation-in-part of Ser. No. 170,017, , and Ser. No. 20,916.

[51] Int. Cl.$^4$ .............................................. B60K 41/06
[52] U.S. Cl. ......................................... 74/859; 74/866
[58] Field of Search .................. 74/857, 859, 860, 866, 74/877, 872, 856; 123/478, 480

[56] References Cited

U.S. PATENT DOCUMENTS

| | | | |
|---|---|---|---|
| 4,023,641 | 5/1977 | Ganoung | 180/66 R |
| 4,148,230 | 4/1979 | Kodama et al. | 74/859 |
| 4,280,469 | 7/1981 | Ganoung | 123/568 |
| 4,342,298 | 8/1982 | Ganoung | 74/877 |
| 4,353,272 | 10/1982 | Schneider et al. | 74/857 X |
| 4,383,456 | 5/1983 | Ganoung | 74/866 |
| 4,470,390 | 9/1984 | Omori et al. | 123/480 X |
| 4,473,052 | 9/1984 | Kamiyama et al. | 123/480 X |
| 4,492,203 | 1/1985 | Yutaka | 123/478 |
| 4,505,169 | 3/1985 | Ganoung | 74/866 |
| 4,546,673 | 10/1985 | Shigematsu et al. | 74/866 |
| 4,566,417 | 1/1986 | Suzuki et al. | 123/478 |

*Primary Examiner*—Leslie A. Braun
*Assistant Examiner*—David Novais

[57] ABSTRACT

Engine control apparatus for use in passenger cars and other applications includes a special calibration of the engine intake mixture preparation system. Although this calibration duplicates the optimum calibration for use with a continuously variable transmission (CVT), the apparatus instead includes, for reasons of practicality, a discrete-ratio powershift transmission. Also included is a feedback control system which dispenses with the conventional mechanical connection between accelerator pedal and engine throttle valve. This drive-by-wire control system operates the engine as closely as is practical to the optimum CVT engine operating schedule, a predominantly wide-open-throttle engine operating schedule. The overall combination of special engine calibration and drive-by-wire control with a discrete-ratio transmission can offer the majority of the fuel economy advantage available with a CVT.

12 Claims, 6 Drawing Sheets

ENGINE CONTROL APPARATUS FOR IMPROVED FUEL ECONOMY

CROSS REFERENCE TO RELATED APPLICATIONS

The present application is a continuation-in-part of my copending application Ser. No. 06/771,660 filed September 3, 1985 and entitled "Combustion Engine Control Apparatus." The present application is in fact the eighth in a series of continuation-in-part applications throughout which copending status has been maintained. The following table lists the seven previous applications in this series.

| Filing Date | Ser. No. | Pat. No. |
| --- | --- | --- |
| September 3, 1985 | 771,660 | abandoned |
| January 7, 1985 | 689,185 | Pending |
| December 20, 1982 | 451,613 | 4,505,169 |
| November 10, 1980 | 205,625 | 4,383,456 |
| March 14, 1979 | 20,916 | 4,280,469 |
| February 7, 1977 | 767,060 | (abandoned) |
| September 25, 1975 | 616,640 | 4,023,641 |

In addition, the present application and the four most recent applications in the above table continue an overlapping series of continuation-in-part applications which began with my application Ser. No. 170,017 filed July 18, 1980 and now issued as U.S. Pat. No. 4,342,298.

More specifically, this application is a continuation-in-part application of application Ser. No. 771,660, filed Sept. 3, 1985 now abandoned, which is a continuation-in-part application of application Ser. No. 170,017, filed July 18, 1980 now U.S. Pat. No. 4,342,298, which is a continuation-in-part application of application Ser. No. 020,916, filed Mar. 14, 1979 now U.S. Pat. No. 4,280,469, which is a continuation-in-part application of application Ser. No. 767,060, filed Feb. 9, 1977 now abandoned, which is a continuation-in-part application of application Ser. No. 616,640, filed Sept. 25, 1975 now U.S. Pat. No. 4,023,641. Said application Ser. No. 771,660 is also a continuation-in-part application of application Ser. No. 689,185, filed Jan. 7, 1985 presently pending which is a continuation-in-part application of application Ser. No. 451,613, filed Dec. 20, 1982 now U.S. Pat. No. 4,505,169, which is a continuation-in-part application of application Ser. No. 205,625, filed Nov. 10, 1980 now U.S. Pat. No. 4,383,456, which is a continuation-in-part application of said application Ser. Nos. 170,017 and 020,916.

BACKGROUND OF THE INVENTION

1. Field of the Invention

This invention relates to apparatus for controlling the operation of a combustion engine in response to an input command.

2. Description of the Prior Art

Automotive engineers have long recognized that a continuously variable transmission (CVT) can in theory be used to restrict a passenger car engine to a fixed operating schedule of throttle position versus crankshaft speed. The operating schedule has often been chosen to coincide with the line of minimum brake specific fuel consumption across the engine map of throttle position versus crankshaft speed.

Nevertheless, practical considerations have often received less emphasis. For instance, CVT's have yet to make a significant impact in passenger car use, not to mention large over-the-highway tractors. Moreover, a conventional transmission with a large number of closely-spaced gear ratios can have a more than offsetting advantage in ratio range in comparison to a CVT. More importantly, the prior art has failed to recognize the synergism between drive-by-wire control and the approximation of a CVT engine operating schedule using a discrete-ratio transmission. For example, in U.S. Pat. No. 4,353,272 Schneider et al disclose a drive-by-wire control system adaptable to both CV and discrete-ratio transmissions, but evidently without realizing that synergism exists only for the case of discrete-ratio transmissions. Equally important is the failure of the prior art to recognize that the same special engine calibration is optimum for both CVT and discrete-ratio transmissions.

SUMMARY OF THE INVENTION

In view of the above, it is therefore an object of the present invention to provide apparatus for optimizing the operation of an Otto cycle engine as used in conjunction with a discrete-ratio transmission.

It is also an object of the invention to present apparatus for approximating the optimized operation of an Otto engine that is possible using a continuously variable transmission.

It is another object of the invention to present apparatus for improving the fuel economy of Otto engines which power passenger cars.

These and other objects, features and advantages will become apparent to those skilled in the art from the following detailed description when read in conjunction with the appended claims and the accompanying drawing.

In accordance with the present invention in its broad aspect, apparatus for improving the fuel economy of an Otto cycle engine is presented. The apparatus includes components which are instrumental in preparing the intake mixture consumed by the engine. Over a broad crankshaft speed range, these components provide a high level of intake charge dilution when the engine throttle is wide open or effectively wide open. The apparatus also includes a feedback control system and a discrete-ratio gearbox through which the Otto engine delivers its power output. The feedback control system is of the type which can approximate an engine operating schedule with no shift schedule hysteresis beyond that necessitated by the gaps between the various gear ratios in the gearbox.

BRIEF DESCRIPTION OF THE DRAWING

The present invention is illustrated in the accompanying drawing, in which.

In the figures of the drawing, like reference numerals denote like parts.

DESCRIPTION OF THE PREFERRED EMBODIMENTS

Figure 1:
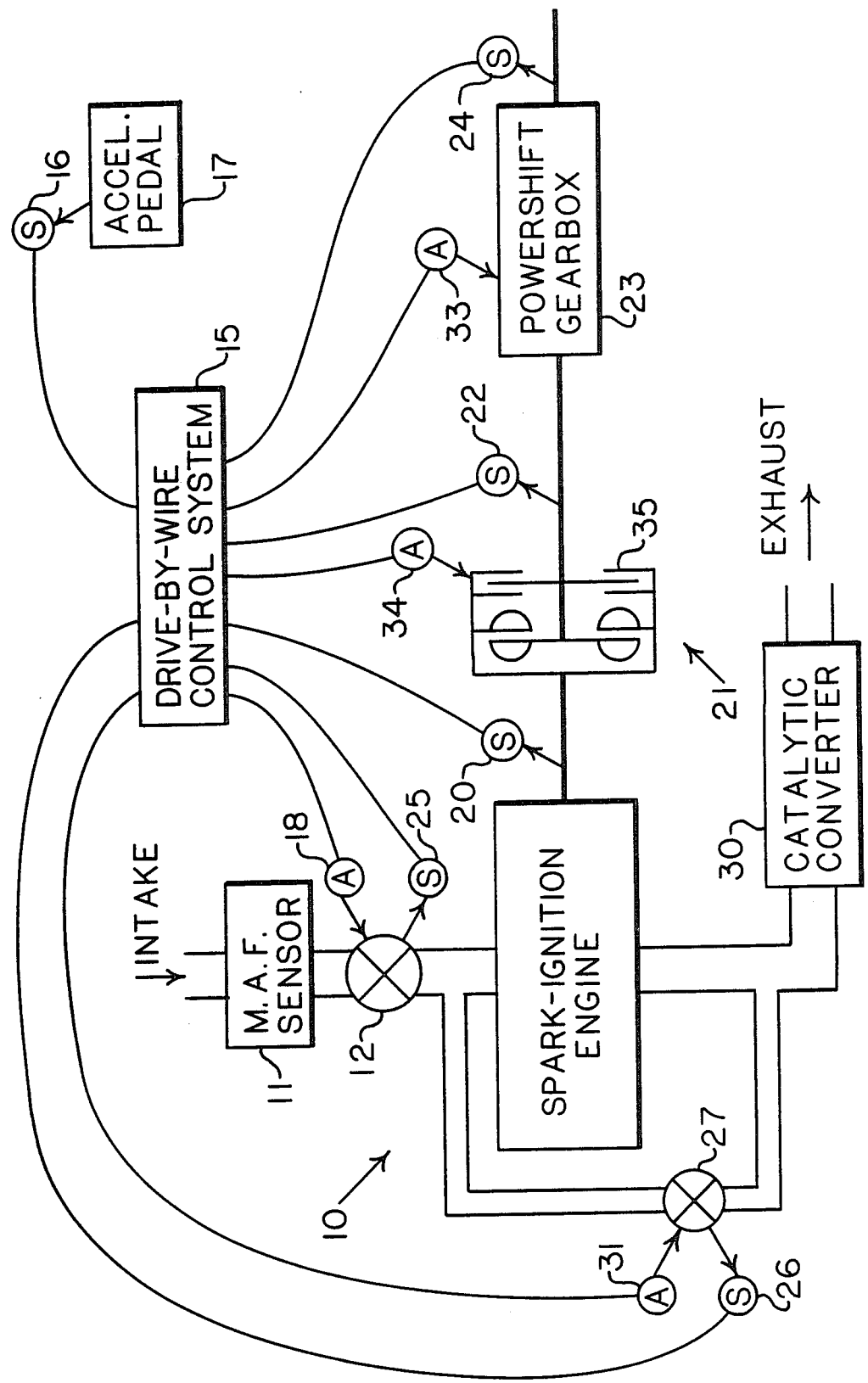
FIG. 1 is a diagram of the components in an automotive powertrain according to a preferred embodiment of the present invention.

FIG. 1 of the drawing shows how the main components would be arranged in a preferred embodiment of the present invention. In FIG. 1, a homogeneous-charge and naturally-aspirated passenger car engine, generally indicated by reference numeral 10, includes a few components which have special importance to the present invention and which therefore are explicitly shown and identified by separate reference numerals. For example, combustion intake air consumed by the engine 10 passes first through the mass air flow sensor 11 and then through the engine throttle valve 12 before entering the cylinders of the engine 10. Other components of the engine 10, such as individual fuel injectors for the intake port of each individual cylinder of the engine 10, are not shown explicitly in FIG. 1 because these components do not interact directly with the main components of the invention shown in FIG. 1. Nevertheless, the engine 10 does include a fully-sequential intake port fuel injection system of which the mass air flow sensor 11 is part, and the engine 10 also includes design features currently used in production passenger car engines to counteract the reduced expansion velocity component of cylinder flame speed arising from high rates of exhaust gas recirculation (EGR).

As shown, the control system 15 in FIG. 1 receives inputs from several sensors and in turn supplies outputs to several actuators. Exemplifying the sensors is the sensor 16 which delivers to the control system 15 an electrical signal indicating the position of the accelerator pedal 17 as selected by the driver of the associated passenger car. Like the sensor 16, all of the other sensors in FIG. 1 are denoted symbolically by the letter "S", for sensor, enclosed in a small circle. Similarly, the actuator 18 varies the position of the engine throttle valve 12 in response to a command signal from the control system 15, the actuator 18 being denoted symbolically by the letter "A" in a small circle. Since this actuator 18 can adjust the position of the engine throttle 12 independently of the drrver's adjustment of the pedal 17, the control system 15 falls into a category known as drive-by-wire (DBW) control systems. The construction and operation of this DBW control system 15 will be considered in more detail with reference to other figures of the drawing.

Again in consideration of sensors with inputs to the control system 15, the sensor 20 supplies the control system 15 with an electrical RPM signal indicating the rotational speed with which the crankshaft of the engine 1 directlydrives the power input of a fluid coupling assembly 21. A second RPM sensor 22 supplies the control system 15 with an electrical signal indicating the output shaft rotational speed of the coupling assembly 21. This RPM signal from the second sensor 22 also indicates the input shaft rotational speed of a 4-speed powershift gearbox 23 because the coupling assembly 21 directly drives the gearbox 23. The last RP sensor 24 measures the power output shaft speed of the gearbox 23, which drives the traction wheels of the associated passenger car through any suitable final drive arrangement (not shown). The two remaining sensors 25 and 26 in FIG. 1 supply the control system 15 with electrical position signals. Specifically, the sensor 25 indicates the position of the engine throttle valve 12, and the sensor 26 indicates the position of the engine EGR valve 27.

As shown in FIG. 1, the EGR valve 27 does follow conventional practice by diverting exhaust back to intake from a point in the engine exhaust system upstream of the catalytic converter 30 to a point in the engine intake system downstream of the throttle valve 12. In contrast, the actuator 31 which controls the EGR valve 27 does not follow the conventional practice of relying on engine intake manifold vacuum as a power source. The actuator 31 may, however, borrow from what is conventional practice in the case of Diesel passenger car engines. That is, the EGR actuator 31 must use a source of constant vacuum for power for alternatively, any other power source fully available at all times when the engine 10 is operating with its throttle 12 in the wide open position.

Last in FIG. 1 are the actuators 33 and 34. The gearbox shift actuator 33 enables the gear ratio in the gearbox 23 as selected by the control system 15 in a manner that will be considered later. Also in response to the control system 15, the other actuator 34 engages and releases a lock-up clutch 35 within the fluid coupling assembly 21. As a result, the coupling 21 acts as a solid connection when the lock-up clutch 35 is fully engaged, but purely as a fluid coupling when the clutch 35 is released.

Engine Dynamometer Testing

Figure 2:
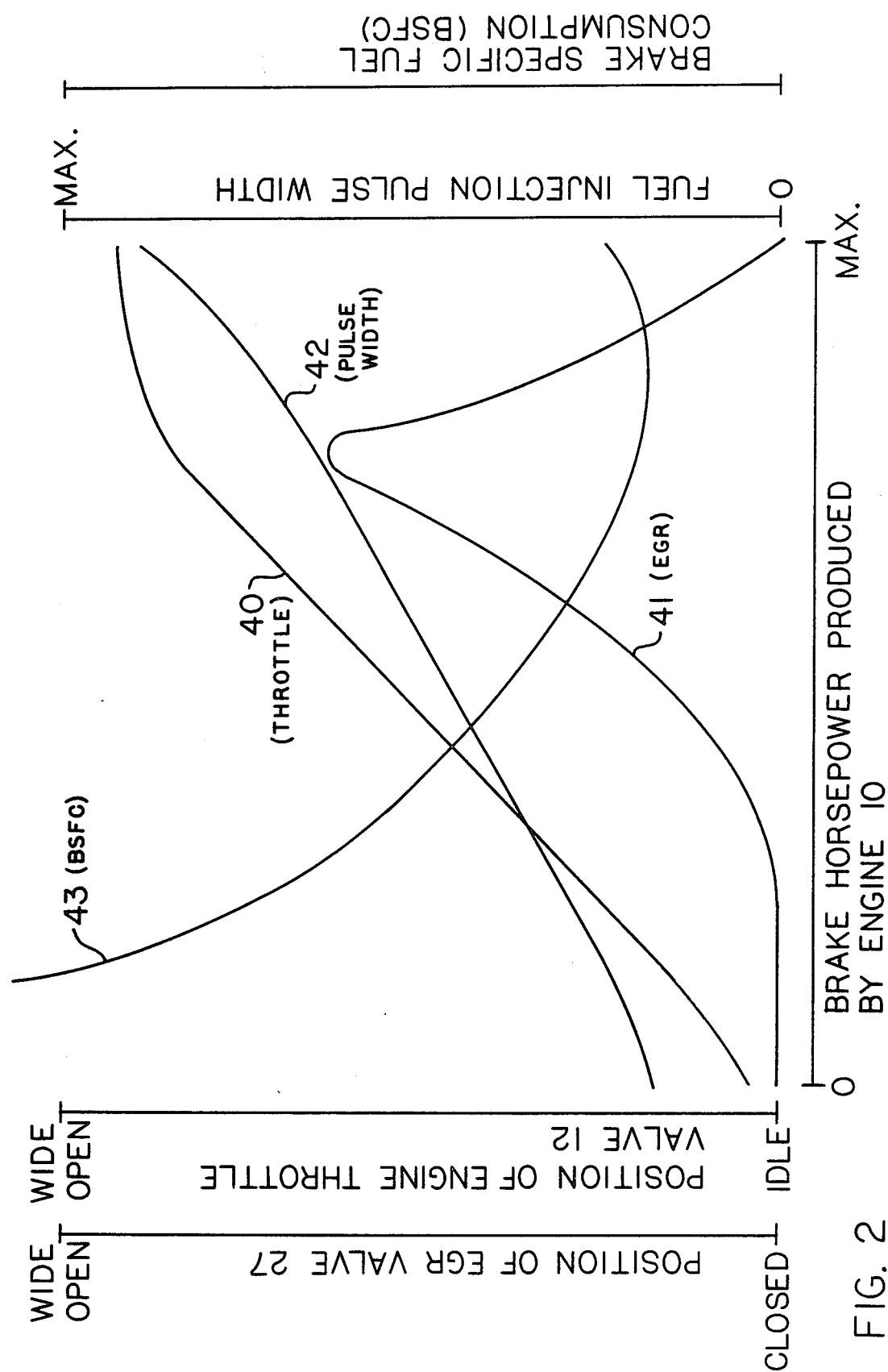
FIG. 2 represents stationary dynamometer data for the engine of FIG. 1.

In order that the control system 15 can be calibrated to establish optimum operating conditions for the engine 10, performance characteristics of the engine 10 must first be determined from stationary dynamometer testing of the engine 10 or an engine identical in design to the engine 10, including the design of the complete engine exhaust system to be used in the associated passenger car. FIG. 2 of the drawing reveals the nature of the dynamometer testing.

The entire process soon to be described for obtaining the various curves shown in FIG. 2 takes place at a fixed crankshaft speed of the engine 10. Moreover, the test results represented in FIG. 2 must be obtained for each in a progression of representative, fixed speeds of the engine 10. Throughout all of this testing, two procedures are always followed. First, the mass air flow sensor 11 is used in conjunction with the engine exhaust oxygen sensor (not explicitly shown in the drawing) to perform the normal "closed-loop" function of adjusting the time width of the fuel injection pulse for the engine 10 to thereby maintain the gasoline injected into the intake ports of the engine 10 in stoichiometric proportion to the air being consumed for combustion; this stoichiometric proportion is maintained even during operation with the engine throttle 12 wide open, but it should be abandoned at high levels of intake manifold vacuum in the engine 10. Second, the ignition spark timing advance for the engine 10 is always maintained at the minimum value which produces best torque (commonly known as MBT spark timing) under the existing engine operating conditions. Following these two procedures, and holding crankshaft speed constant, the engine 10 will be capable of a range of power output. One such range of power serves as the horizontal axis seen in FIG. 2.

Against this horizontal axis of power available at a particular crankshaft speed of the engine 10, position of the engine throttle 12 is shown by the curve 40, position of the EGR valve 27 by the curve 41, time width of the fuel injector opening pulse for the engine 10 by the curve 42 and the resultant brake specific fuel consumption (BSFC) of the engine 10 by the curve 43. These curves 40, 41, 42 and 43 are obtained from dynamometer testing of the engine 10, or an identical engine, such that any particular BSFC given by the BSFC curve 43 is the minimum BSFC with which the engine 10 can deliver the corresponding value of brake power on the horizontal axis of FIG. 2 while also operating at the single crankshaft speed for which FIG. 2 is valid. In other words, the engine 10 could operate more efficiently only if the blanket procedure of always supplying a stoichiometric air-fuel charge were abandoned in favor of lean operation. The engine 10 uses recirculated exhaust gas as the intake charge dilutant instead of dilution with the excess air of lean combustion so that the 3-way catalytic converter 30 can reduce nitrogen oxides while at the same time oxidizing hydrocarbons and carbon monoxide.

The curves 40, 41, 42 and 43 in FIG. 2 are obtained in the following way. First, test operation of the engine 10 determines the approximate brake torque that results with the engine throttle 12 wide open and the EGR valve 27 completely closed. Still with the EGR valve 27 closed, the throttle 12 is next closed to reduce brake torque to roughly 30% of the wide-open-throttle value just measured; BSFC is measured at this dynamometer operating point of the engine 10. Now with no change in injector pulse width, and consequently no change in fuel consumption rate, the EGR value 27 is opened by increments and BSFC measured at each of the resulting positions of the EGR valve 27. The constant pulse width of this last procedure usually requires that the engine throttle 12 be opened somewhat as the EGR valve 27 is opened because the increasing recirculation of exhaust gas tends to relieve the pressure drop across the engine throttle 12. At any rate, this trial-and-error procedure identifies the particular combination of positions of the throttle 12 and EGR valve 27 which minimize BSFC for the original pulse width and corresponding constant fuel flow rate. Only values determined from this minimum BSFC operating condition become data points on the curves 40, 41, 42 and 43 in FIG. 2, and these data points are of course located laterally in FIG. 2 by the brake power developed at the minimum BSFC condition for the original pulse width. Next, the injection pulse width is increased by a small increment and the minimum BSFC condition determined for the new pulse width in exactly the same manner as just described for the original pulse width. This will obviously produce another data point on each of the curves 40, 41, 42 and 43 at a lateral position somewhat to the right in FIG. 2 of the data points first located. In this way, the engine data curves 40, 41, 42 and 43 are extended to the right in FIG. 2 until the engine throttle 12 first reaches its wide open position, or an effectively wide open position beyond which very little increase in mass air flow through the sensor 11 occurs.

As seen in FIG. 2, the throttle position curve 40 does not reach its wide open position, nor does the curve 40 reach its idle position when engine power is zero. As just suggested, the maximum throttle opening attained by the curve 40 is an effectively wide open position beyond which very little extra air flow results. This condition of essentially maximum air flow at distinctly less than the actually wide open position of the throttle 12 normally occurs only for low to medium crankshaft speeds of the engine 10. The curve 40 could nevertheless continue to its wide open position, but the curve 40 levels off to thereby enhance the response of the DBW control system 15. The curve 40 does not reach its idle position at zero engine power output simply because the idle position produces zero power output only at engine idle speed, while FIG. 2 represents a low to medium crankshaft speed.

The process already described for determining the curves 40, 41, 42 and 43 requires that increasing opening of the engine throttle 12 be accompanied by increase in the mass percentage accounted for by EGR in the intake mixture consumed by the engine 10. The consequent need for high EGR flow when the pressure drop across the EGR valve 27 is being relieved by large opening of the engine throttle 12 means that the EGR valve 27 and its connecting flow passageways in the engine 10 must have the large proportions more normal for a Diesel engine than for the gasoline engine 10. Even so, two factors mitigate any need for the engine 10 to employ the exhaust backpressure regulation that is sometimes used as part of the EGR control system on Diesel passenger car engines. First, the catalytic converter 30 causes exhaust backpressure generally well in excess of unregulated backpressure in Diesel engines. And second, Diesel engines often require substantial EGR flow when unthrottled engine operation is combined with the low backpressure of low brake torque output. This combination never exists for the engine 10, but the engine 10 does require that cylinder-to-cylinder and cycle-to-cycle distribution of recirculated exhaust gas be very consistent.

Considering now the extreme righthand portion of FIG. 2 where an effectively wide open position of the engine throttle 12 is maintained by only slight increase in the opening of the throttle 12, further increases in brake torque are achieved by progressively closing the EGR valve 27. Consequently, the extreme righthand portions of the curves 40, 41, 42 and 43 are determined without resorting to the trial-and-error procedure used when the fuel flow rate to the engine 10 can be held constant in spite of adjustment of the EGR valve 27. Another feature of the righthand portion of FIG. 2 is that the minimum BSFC value along the entire BSFC curve 43 accompanies an effectively wide open position of the engine throttle 12 in combination with a reduced opening of the EGR valve 27. This is true regardless of whether the constant engine speed being investigated is high or low.

The extreme lefthand portions of the curves 40, 41, 42, and 43 are completed by incrementally decreasing injection pulse width from its original value and continuing to apply at each increment the trial-and-error process already explained for determining minimum BSFC at a constant fuel consumption rate and constant engine speed. FIG. 2 confirms that the trial-and-error process is also unnecessary at the very low brake torque levels where EGR acts only to increase BSFC.

As noted earlier, the entire testing procedure represented by FIG. 2 is to be repeated throughout a progression of representative crankshaft speeds of the engine 10 extending from idle RPM to the RPM at which maximum brake power is developed by the engine 10. Thus, each of the curves 40, 41, 42 and 43 is only the intersection of one of the resulting three-dimensional data surfaces (for throttle position, EGR valve position, fuel injection pulse width and BSFC) with a plane surface located at the constant engine speed used to generate the curves 40, 41, 42 and 43. More importantly, the whole purpose of stationary dynamometer testing of the engine 10 is to obtain these four surfaces of data located above the plane of brake power produced by the engine 10 versus crankshaft speed of the engine 10. In addition, the corresponding data surface for MBT spark timing of the engine 10 is needed, but not used directly by the drive-by-wire control system 15.

When the "subprocedure" in intake pressure.)" represented by FIG. 2 is employed at crankshaft speeds of the engine 10 near its idle speed, considerations of NVH (noise, vibration and harshness) of the associated passenger car will almost certainly outweigh the importance of BSFC. Taking a slightly different viewpoint, the BSFC curve 43 is in reality the curve of the cost in fuel for each brake-horsepower-hour of mechanical energy delivered by the engine 10. The three-dimensional brake specific fuel cost function which encompasses the fuel cost curve 43 can be extended, via estimated weighting factors, to include other operational costs such as of NVH and engine exhaust emissions. In fact, all of the dynamometer testing of the engine 10 should include brake specific measurements of all relevant chemical species of exhaust emissions in order that the three-dimensional brake specific cost function exemplified by curve 43 can be extended, if necessary, to include exhaust emissions.

Before leaving the subject of NVH, it should be noted that high fuel efficiency characterizes operation of the engine 10 with its throttle 12 effectively wide open. On the other hand, power output with the throttle 12 effectively wide open can be taken only so low before encountering a limit determined by NVH considerations. While appropriate design of the powertrain components in FIG. 1 and of the associated passenger car can reduce this lower limit, the limit is inherently lower than might immediately be obvious. In the first place, the high EGR rate corresponding to the peak value of the curve 41 will usually reduce wide-open-throttle torque of the engine 10 by at least 30% in comparison to wide-open-throttle operation at the same RPM using a conventional engine calibration (no EGR and enrichment well past stoichiometric). Thus, power is reduced by an equal amount, but the reduction in torque itself allows a significant lowering of the minimum RPM acceptable with the throttle 12 effectively wide open. So EGR dilution of the intake charge consumed by the engine 10 lowers both the minimum torque and the minimum RPM produced with the throttle 12 effectively wide open, but produced without exceeding chosen NVH limits.

Regardless of the various weighting factors that could be included in the three-dimensional brake specific cost function for the engine 10, the preferred procedure is that the initial weighting factors be one for fuel consumption and zero for all other factors. NVH and engine durability problems can then be avoided simply by considering an appropriate area of low RPM, high brake torque operation of the engine 10 to be unattainable, just as crankshaft RPM above the maximum for the engine 10 will be considered unattainable. If, however, the initial weighting factors result in unacceptably high exhaust emission levels during chassis dynamometer testing of the associated passenger car, only then should additional non-zero weighting factors be considered. If weighting factors are added for exhaust emissions, they should be very modest at first because their effect is twofold. First, the particular combination of position of the throttle 12 and position of the EGR valve 27 occurring at a particular power level in FIG. 2 depends on how importance is apportioned by weighting factors among various considerations such as fuel consumption and exhaust emissions. For this reason, all initially "non-optimum" dynamometer test results for the engine 10 should be retained for possible further use. Moreover, the weighting factors have a second influence—on a procedure that will be explained with reference to FIG. 5. Another consideration is that a very significant improvement in a secondary engine performance parameter, such as emissions of nitrogen oxides, could possibly be secured with an almost insignificant sacrifice in the primary performance parameter, that of fuel efficiency. Only very modest weighting factors for the secondary parameters will accurately identify such a situation. In any case, the weighting factor for BSFC should overshadow all other weighting factors to the extent that the lowest part of the brake specific cost curves, of which the curve 43 is an example, will in general occur when the throttle 12 is effectively wide open. At low RPM of the engine 10, an NVH weighting factor can of course shift the lowest portion of the brake specific cost curve well away from effectively wide-open-throttle operation of the engine 10.

If a significant conflict arises between acceptable exhaust emission levels and minimum BSFC, then the emissions control hardware used on the engine 10 should be upgraded. For example, an added engine-driven air pump could be used to further reduce hydrocarbon and carbon monoxide emissions by injecting air into a second oxidation-only bed of the catalytic converter 30. As another example, heat insulation and a mounting location closer to the engine 10 will each increase the operating temperature of the catalytic converter 30. Moreover, the current automotive practice of retarding ignition spark timing to reduce exhaust emissions is to be used only as a last resort; the spark timing of the engine 10 is, however, retarded from MBT in response to an autoignition sensor mounted on the engine 10. (Retarded spark timing acts to reduce exhaust emissions in two ways, but at the expense of engine operating efficiency. First, reduced peak combustion temperature moderates the formation of nitrogen oxides; increased EGR dilution of the air-fuel charge will usually accomplish the same thing without nearly so much sacrifice in engine efficiency. Second, retarded spark timing increases the operating temperature of the catalytic converter 30, but, as just explained, there are better ways to do this.)

In final consideration of dynamometer testing of the engine 10, ignition spark timing is, as implied before, advanced to maintain MBT timing in spite of the decrease in burn rate which accompanies the trial-and-error procedure that locates minimum BSFC at constant fuel injection pulse width. This is not to say that MBT spark timing cannot be abandoned to control autoignition in very limited areas of the final calibration of the engine 10. As is widely appreciated, the alternative of a lower engine compression ratio sacrifices efficiency in all areas of engine operation, rather than in just the problem areas.

Dynamometer Testing of Some Alternative Engine Types

As the first example of alternative engine types, sufficiently lenient standards for exhaust emissions would allow the engine 10 to use the excess air of lean combustion to replace recirculated exhaust gas as the dilutant for the intake charge consumed by the engine 10. In this case, the EGR valve 27 and its associated sensor 26 and actuator 31 would be eliminated entirely. Moreover, the previous trial-and-error procedure for obtaining minimum brake specific cost of operating the engine 10 at constant crankshaft RPM and at constant fuel injection pulse width would become more convenient. Dilution would be increased in search of minimum brake specific cost simply by further opening the engine throttle 12. All other aspects of stationary engine dynamometer testing would remain basically as already described for the engine 10, except of course, that there would be no EGR valve position curve like the curve 41 in FIG. 2. This lean-burn variation of the engine 10 offers somewhat improved fuel efficiency due to more complete in-cylinder combustion and due to the improvement in specific heat ratio brought about by dilution with air. On the other hand, the catalytic converter 30 could no longer reduce nitrogen oxides, and oxygen would be more available for the in-cylinder formation of nitrogen oxides.

Figure 3:
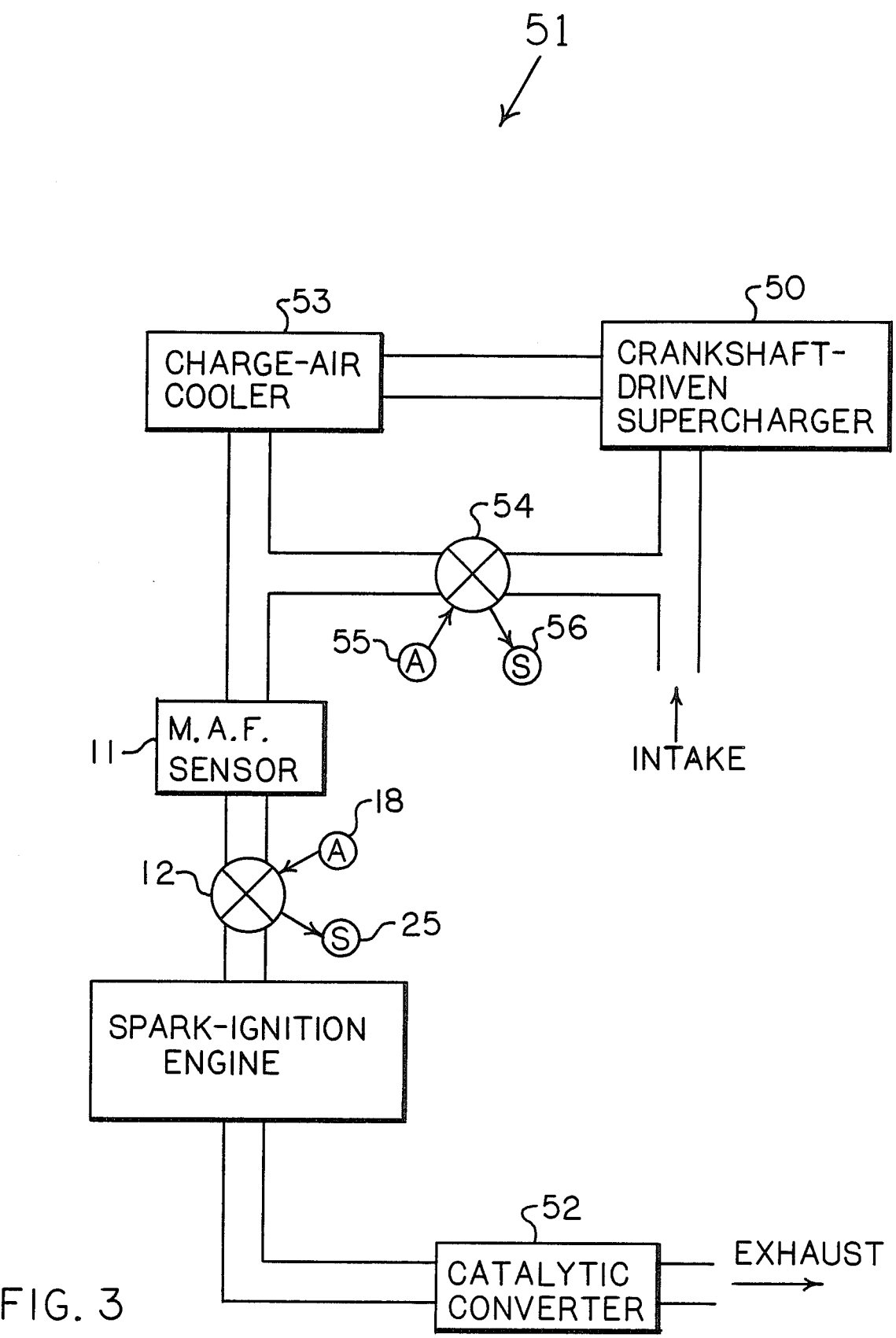
FIG. 3 is a diagram of a supercharged engine that may be used in place of the naturally-aspirated engine of FIG. 1.

The foregoing lean-burn variation of the engine 10 could be further modified to include the crankshaft-driven supercharger 50 shown in FIG. 3. The resulting alternative engine assembly 51 of FIG. 3 still inducts air through the same basic types of mass air flow (MAF) sensor 11 and engine throttle 12 that are shown in both of FIGS. 1 and 3. The optional catalytic converter 52, however, is not the 3-way type 30 shown in FIG. 1, but rather is designed to catalyze only oxidation. In addition, the MAF sensor 11 now operates under boost pressure because pressurized intake air from the supercharger 50 is delivered through the charge-air cooler 53 to the MAF sensor 11. Last in FIG. 3 is the supercharger by-pass valve 54 with its associated actuator 55 and position sensor 56. This by-pass valve 54 allows a variable amount of air cooled by the charge-air cooler 53 to return to the intake of the supercharger 50. That is to say, the by-pass valve 54 serves to regulate the pressure boost provided by the supercharger 50 in a way that reduces power consumed by the supercharger 50 when little or no boost pressure is needed. The air-to-air charge-air cooler 53 also contributes to reduction in the power consumed by the supercharger 50.

Unlike the naturally-aspirated engine 10, the supercharged engine 51 never operates at its highest levels of BMEP (brake mean effective pressure) without an accompanying high level of intake charge dilution. This feature allows the engine 51 to continuously utilize an unusual combination of high boost pressure and compression ratio near normal for a naturally-aspirated engine but without resorting to high-octane fuel. The charge-air cooler 53 also helps in this regard, but intake charge dilution is the more important factor.

Because of the accentuated need for intake charge dilution, the dynamometer test procedure for the supercharged engine 51 departs slightly in principle from that outlined earlier for a lean-burn variation of the naturally-aspirated engine 10. At each representative crankshaft speed of the engine 51, the BSFC for one particular fuel injection pulse width will be minimized just at the point when the by-pass valve 54 first becomes fully closed to provide full boost. (An effectively wide open position of the throttle 12 will always accompany the full boost position of the by-pass valve 54.) The RPM schedule o these particular values of pulse width is chosen as the schedule of maximum pulse width for the engine 51. From a slightly different viewpoint, the dynamometer testing of the engine 51 is basically as outlined earlier for the lean-burn variation of the engine 10, except that the highest BMEP range of the testing does not extend beyond the trial-and-error process also used for the great majority of the middle and lower BMEP range. (For the lean-burn variation of the naturally-aspirated engine 10, the highest BMEP range results from progressively reducing intake charge dilution in search of minimum BSFC, but the dilution is reduced simply by increasing fuel injection pulse width.)

In more detail, the by-pass valve 54 can close to apply boost pressure to the engine 51 more quickly if the valve 54 does not open beyond the smallest opening that relieves substantially all of the pressure rise occurring through the supercharger 50. This smallest effectively wide open position of the valve 54 will obviously increase as a function of the crankshaft speed of the engine 51, and the valve 54 is to follow this function whenever the engine throttle 12 is less than effectively wide open. Similarly, the throttle 12 follows its current minimum for being effectively wide open whenever the by-pass valve 54 is closed far enough to apply boost to the engine 51. So the by-pass valve 54 is effectively wide open at lower BMEP of the engine 51, and the throttle 12 is effectively wide open at higher BMEP. The corresponding data surfaces for positions of the throttle 12 and by-pass valve 54 are determined in the stationary dynamometer testing of the engine 51. As a result, extra intake charge dilution is added at higher BMEP of the engine 51 by further closing the by-pass valve 54, rather than by further opening the throttle 12, as is the case at lower BMEP. In either case, just enough dilution with the excess air of lean combustion is added to minimize BSFC for a given fuel injection pulse width. The results of this minimization are data surfaces of BSFC and pulse width located above the plane of crankshaft speed of the engine 51 versus brake power produced by the engine 51. The minimum BSFC at any fixed crankshaft speed of the engine 51 will always accompany full boost if the engine 51 is calibrated as just explained. (Full boost pressure is actually a pressure function of the crankshaft speed of the engine 51 because the engine 51 receives full boost pressure whenever the throttle valve 12 is effectively wide open and the by-pass valve 54 is at the same time fully closed. Moreover, other apparatus, such as that which determines the fixed drive speed ratio for the supercharger 50, also influences the maximum density of the engine intake air existing on the downstream side of the throttle valve 12. However, as will be explained later, the drive-by-wire control system 15 would use only the positions of the valves 12 and 54 in regulating intake air density to thereby control the torque output of the engine 51 in response to the desired amount of engine power output as being indicated by the position of the accelerator pedal 17. Thus, the supercharger drive speed ratio for the engine 51 plays no direct role in determining whether the control system 15 is causing full boost pressure to be applied to the engine 51. Similarly, the boost pressure relief setting for the exhaust wastegate in a completely conventional turbocharger system does not regulate engine torque in respnse to a varying amount of power desired by the operator of the engine; full boost pressure as defined herein exists in such a conventional turbocharger system whenever the engine throttle valve is wide open, regardless of whether the turbocharger can under the existing conditions actually supply much boost in intake pressure.)

The BSFC of the engine 51 could be reduced to values less than the minima achieved using the overall dynamometer testing as just described. Nothing more is required than increasing injection pulse width at full boost until BSFC reaches its minimum, but at the same time, higher fuel octane would be necessary. (As always, MBT spark timing of the engine 51 must also be maintained.) As an alternative utilization of higher fuel octane, higher supercharger boost pressure can be used with exactly the same dynamometer test and calibration procedure already explained for the engine 51. This alternative is preferred because it is likely to yield a greater benefit in BSFC; it will also require design change, as in the drive ratio for the supercharger 50. (In effect, only the more undesirable of these two alternatives is available for naturally-aspirated engines like the engine 10.) After selecting this more desirable alternative, boost pressure can still be traded off against engine compression ratio, but only a quite ambitious dynamometer study would yield the optimum tradeoff. As a rough guide, charge-air densities 1½ to 2 times sea level atmospheric density can usually be combined with compression ratios near those normal for a naturally-aspirated, spark-ignition engine operating on gasoline having an octane rating of about 90. As will become more evident, the engine 51 will operate under near-maximum boost much more extensively than is usual for a conventional supercharged passenger car engine.

In operation, the engine 51 requires a fuel injection pulse width that is based on the mass air flow signal from the MAF sensor 11 and on another measured parameter, preferably the crankshaft speed of the engine 51. The necessary data relating fuel-air ratio to crankshaft speed and to the mass flow rate of combustion air is easily obtained by measuring mass air flow rate throughout the dynamometer test procedure for the engine 51. This fuel-air ratio data is stored in read-only-memory of the fuel injection system of the engine assembly 51, and the resulting control of injection pulse width will inherently help compensate for changes in atmospheric density of the combustion air inducted by the engine 51. An alternative approach does not require the MAF sensor 11, but neither does it inherently compensate for changes in operating altitude or for transient errors in the positions of the throttle 12 and the by-pass valve 54 relative to each other. For this alternative approach, injection pulse width is retrieved from the dynamometer data for the engine 51 using measured values for crankshaft speed and for position of the throttle 12. In this alternative case the corresponding read-only-memory data is stored not in what is normally thought of as the engine fuel injection system but rather in an engine data storage and control unit 90 that will be considered with reference to FIG. 6.

The supercharged engine 51 is preferred to the naturally-aspirated engine 10 for certain applications of the powertrain components of FIG. 1 which satisfy two conditions. The engine 51 must be able to meet the applicable standards for exhaust emissions with little compromise in fuel efficiency, and the cost penalty of the supercharger 50 must not be prohibitive. These conditions are much more common for trucks than for passenger cars, and more common still for other applications such as agricultural equipment. In fact, the engine 51 could operate on propane to be cost competitive with Diesel engines even without the benefit of the transmission shift scheduling that will be explained with reference to FIGS. 5 and 6. Aside from being an inexpensive fuel for spark-ignition engines, propane greatly reduces exhaust emissions of hydrocarbons and carbon monoxide during cold engine operation. This last advantage makes the oxidizing catalytic converter 52 less necessary.

Figure 4:
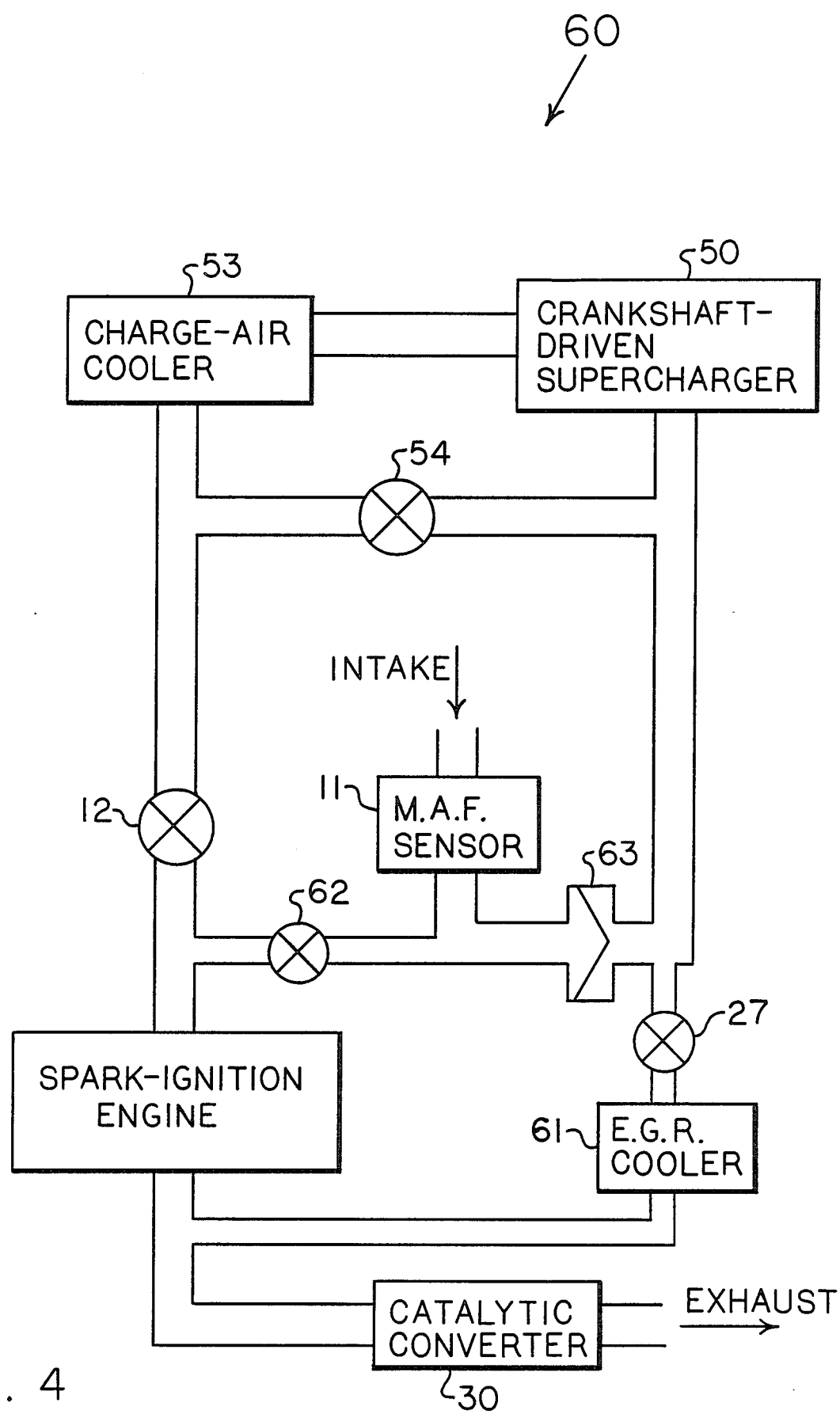
FIG. 4 is a diagram of another supercharged engine.

FIG. 4 reveals the main features of a supercharged engine assembly 60 which would consume a stoichiometric airfuel mixture diluted only with recirculated exhaust gas. This third engine 60 thus combines features and components from each of the two previous engines 10 and 51. From the engine 10, the third engine 60 adopts the 3-way type of catalytic converter 30 and the EGR valve 27, but the EGR valve 27 now recirculates exhaust gas to a point upstream of the main throttle valve 12 and, in fact, upstream of the supercharger 50. This modification is needed because exhaust gas will not freely recirculate into pressurized charge-air being pumped into the engine cylinders by the supercharger 50. An EGR cooler 61 is added to cool and condense moisture from the exhaust gas before it reaches the EGR valve 27. From the supercharged, lean-burn engine 51, the third engine 60 adopts the crankshaft-driven supercharger 50 and its associated charge-air cooler 53 and by-pass valve 54.

The MAF sensor 11 now supplies filtered intake air both to the inlet of the supercharger 50 and directly to the cylinders of the engine 60 through the auxiliary throttle valve 62. An automatic valve 63 prevents reverse flow from the supercharger 50 to the MAF sensor 11.

During unboosted operation of the engine 60, the EGR rate is determined in large measure by the relative flow areas through the throttle valves 12 and 62. On the other hand, the auxiliary throttle 62, which provides all flow for engine idle and engine braking conditions, must be completely closed to prevent backflow whenever the by-pass valve 54 is closed enough to provide boost pressure. (A second automatically-closing valve could be added for this purpose.) Consequently, the EGR rate at high BMEP depends entirely on the EGR valve 27.

The reason for including the auxiliary throttle 62 in the first place is that the volume within the supercharge 50, charge-air cooler 53 and connecting ducting cannot be cleared of exhaust gas nearly as quickly as the main throttle 12 must respond to a closing command. Since the auxiliary throttle 62 provides nearly instant availability of air containing no exhaust gas, there is actually no need to clear exhaust gas from the supercharger 50 and associated components.

For applications where exhaust emission standards for nitrogen oxides require EGR, the naturally-aspirated engine 10 is preferred to the supercharged engine 60 simply because of the developmental difficulties associated with proper coordination, especially during transient conditions.of the valves 12, 27, 54 and 62 in FIG. 4. The volume within the supercharger 50 and related components in FIG. 4 also introduces a transient error in the mass air flow signal developed by the MAF sensor 11. Nevertheless, developmental difficulties can be alleviated somewhat by eliminating the by-pass valve 54 in FIG. 4. This simplification will diminish fuel efficiency less if the crankshaft-driven supercharger 50 were replaced by an exhaust-turbine-driven supercharger, or turbocharger. These last two modifications can also be applied singly or in combination to the lean-burn, supercharged engine 51 of FIG. 3. All such variations of supercharged engines to be used in the present invention employ high levels of intake charge dilution at high BMEP because of the reasons already stated with reference to the engine 51 of FIG. 3.

Even though the engine 60 has four separate valves used in the control of engine brake torque output, while the engines 10 and 51 each have only two such valves, the basic engine parameters under control are the same in each case. These parameters are the density of the engine intake charge and the amount of dilution of the intake charge. For a typical naturally-aspirated engine like the engine 10, the schedule of minimum BSFC (defined by the minimum points on curves like curve 43 in FIG. 2) requires that EGR displace at least 25% of the stoichiometric mixture that would be inducted in the absence of EGR. In addition, this with displacement of at least 25% of air-fuel mixture would typically cover an effectively wide-open-throttle crankshaft speed range of as much as, or even more than, three-fourths of the range bounded by engine idle speed and the crankshaft speed of maximum power output. Supercharged engines like the engine 51 normally require even higher dilution for minimum BSFC at full boost pressure. By way of comparison, Diesel engines of course use very much higher dilution ratios because intake charge density is not restricted to control engine torque output.

Prior to collecting dynamometer data for any of the engines 10, 51 and 60 or any variations thereof, the engine to be tested should complete a lengthy break-in procedure to ensure a representative state of engine friction. In addition, dynamometer testing of naturally-aspirated engines and engines with crankshaft-driven superchargers should take place at an altitude above sea level representative of the altitude range in which the powertrain components of FIG. 1 are to operate.

Transmission Gear Selection Data

Figure 5:
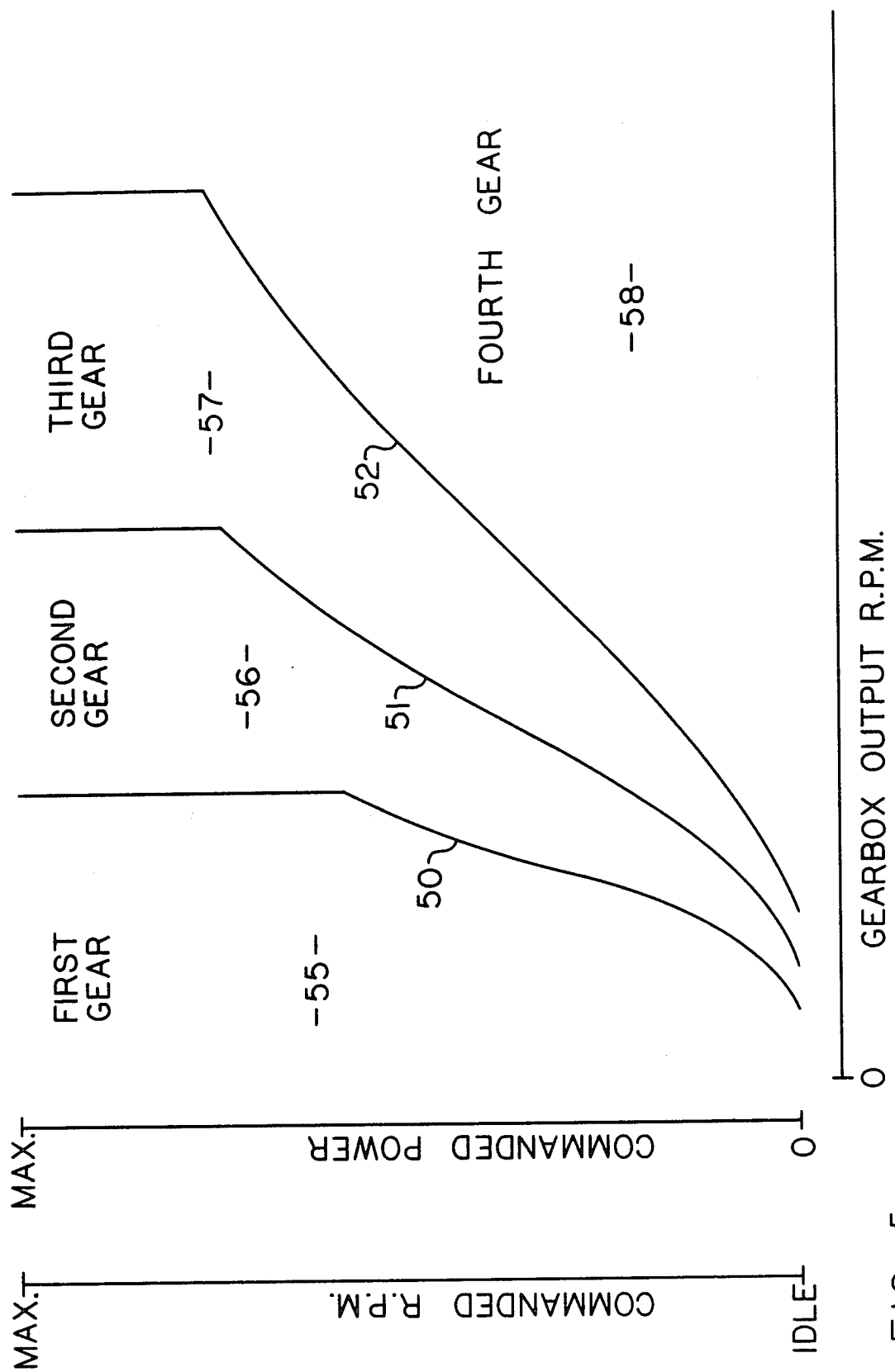
FIG. 5 is a transmission shift map for the powertrain components of FIG. 1.

In anticipation of FIG. 5 of the drawing, the varying conditions under which the powertrain components of FIG. 1 operate depend primarily on the speed of the associated passenger car and on the engine power output desired by the driver of the car. Since the speed of the associated passenger car does vary in direct proportion to the gearbox output RPM measured by the RPM sensor 24, the horizontal axis in FIG. 5 locates gearbox output RPM as derived from the sensor 24. Similarly, the vertical axis in FIG. 5 locates the particular power output level of the engine 10 being commanded by the driver through the accelerator pedal 17 and its associated position sensor 16. Therefore, the map of commanded power output versus measured gearbox output RPM as represented in FIG. 5 is a map which locates an operating point for the powertrain components of FIG. 1.

In general, an arbitrary powertrain operating point on the map of FIG. 5 has associated with it several choices of engine operating conditions made available by the various gear ratios in the gearbox 23. FIG. 5, then, will be a map of the best choice of gear ratio from the standpoint of minimum brake specific operating cost for the engine 10. This map of optimum gearbox ratio is in turn computer generated from gearbox ratios and the engine dynamometer data of which FIG. 2 is representative.

Beginning now with a single arbitrary powertrain operating point on the map of FIG. 5, the particular output RPM of the gearbox 23 for that point translates, via the four gear ratios in the gearbox 23, into four crankshaft speeds of the engine 10. These crankshaft speeds are candidate crankshaft speeds for the vehicle speed and commanded power output represented by the arbitrary powertrain operating point, and these candidate speeds can be established, and measured by either the engine RPM sensor 20 or the fluid coupling output RPM sensor 22, if the fluid coupling lock-up clutch 35 is fully- engaged.

Any candidate crankshaft speeds that would require engine operation beyond the crankshaft speed at which the engine 10 develops its maximum wide-open-throttle power output are immediately eliminated from consideration, as are any candidate speeds too low to allow the commanded power (according to the location of the operating point on the map of FIG. 5) tobe delivered to the input shaft of the gearbox 23. This last determination is made by consulting the dynamometer data plots, of which FIG. 2 is representative, for the candidate crankshaft speeds of the engine 10.

Two more required considerations may eliminate one or more of the remaining candidate operating speeds for the engine 10. First, the higher BMEP (brake mean effective pressure) values attained with greatly reduced EGR levels may not be acceptable because dilution of the air-fuel charge consumed by the engine 10 helps suppress autoignition. This consideration is also satisfied by consulting dynamometer plots like FIG. 2, and it becomes more prevailing as the maximum power output commanded by the fully depressed position of the accelerator pedal 17 more closely approaches the actual maximum power output available from the engine 10. As a good initial value, the maximum power commanded by the pedal 17 (and represented by the uppermost position of the vertical axis in FIG. 5) should be the power output corresponding to the minimum BSFC which appears on the plot like FIG. 2 valid for the crankshaft speed at which the engine 10 develops its maximum power output. This consideration of autoignition can be met by performing all dynamometer tests of the engine 10 with fuel of the lowest anticipated octane and by using an autoignition sensor to define the boundary of unacceptable areas of operation on all of the dynamometer plots like FIG. 2. The second consideration, that of unacceptable NVH prevalent at low RPM and relatively high BMEP, can also be accounted for simply by not considering appropriate areas on plots like FIG. 2 to be attainable by the engine 10. Alternatively, brake specific cost weighting factors can be combined with extremely high cost values for NVH and for autoignition in the appropriate areas of the plots like FIG. 2.

Finally, the brake specific cost values are compared for all candidate engine speeds remaining after all of the foregoing criteria have been applied. More specifically, a dynamometer plot like FIG. 2 but valid for each of the remaining candidate engine speeds is consulted to obtain the brake specific cost value associated with each of the candidate engine speeds. In other words, for example, a value on the brake specific cost curve 43 can be located by using the value of engine power output on the horizontal axis of FIG. 2 that is identical to the value of commanded power output located in FIG. 5 by the arbitrary powertrain operating point under consideration. This is done, not necessarily in FIG. 2, but in each of the dynamometer plots like FIG. 2 and valid for one of the remaining candidate engine speeds. The gear ratio in the gearbox 23 having the lowest brake specific cost associated with its candidate engine speed is of course the optimum gear ratio for the arbitrary powertrain operating point under consideration on the gear ratio selection map of FIG. 5.

In some instances, the comparison of the candidate brake specific cost values will not be necessary because only one or no candidate engine speeds will remain after applying the criteria that have been explained. If one candidate engine speed remains, then obviously the corresponding gear ratio is the optimum. If no candidate speeds remain, then the optimum gear ratio is the one that will provide the highest crankshaft speed of the engine 10 without exceeding the value at which maximum power is produced. In this last case, the power being commanded through the accelerator pedal 17 will not be achieved, but such power debits occur only at the highest levels of commanded power in FIG. 5 and can be reduced by lowering the maximum power commanded by the accelerator pedal position sensor 16. If, on the other hand, somewhat larger power debits are acceptable, then the maximum power commanded by the position sensor 16 can be increased past the initial value chosen as explained previously.

Considering now the gearbox upshift-downshift lines 50, 51 and 52 in FIG. 5, the overall gear selection procedure just explained can be applied repeatedly to a suitably large array of powertrain operating points distributed over the map of FIG. 5. When an appropriate computer program is used to accomplish this task, the area 55 will contain all the powertrain operating points for which the 1st gear ratio in the gearbox 23 is optimum, the area 56 will contain all points for 2nd gear in the gearbox 23, the area 57 will contain all points for 3rd gear, and the area 58 will correspond to 4th gear in the gearbox 23. As shown, the upshift-downshift lines 50, 51 and 52 partition the powertrain map into these areas 55, 56, 57 and 58 whhch often have shapes more or less as shown in FIG. 5.

Although not the ideal situation for the gearbox 23, some gearboxes have equally-spaced gear ratios by virtue of which each upshift between consecutive gear ratios reduces the gearbox input shaft speed by the same percentage when the gearbox output shaft speed remains unchanged during the upshift. Such equally-spaced gear ratios make possible a method of generating a powertrain map of optimum gear ratios with only straight line segments separating the areas for each gear ratio. This method utilizes the second vertical scale shown in FIG. 5, that for commanded crankshaft RPM of the engine 10 as related to the vertical scale of commanded power by an artificial-maximum-BMEP operating schedule for the engine 10.

In more detail, an operating point at a particular vertical position on the map of FIG. 5 and just to the right of line 52 (the shift line having the tallest non-vertical segment) will determine a specific crankshaft RPM of the engine 10. This same RPM value occurs at the same vertical height on the second vertical scale, that for commanded RPM. As the operating point moves along the righthand edge of shift line 52, it will continue to generate a non-linear scale for the vertical axis of commanded RPM in the same manner as just explained for a single operating point. If the map of FIG. 5 is now replotted to make the commanded RPM scale rather than the commanded power scale, linear, then the non-vertical segment of shift line 52 will in the process become straight. If the gear ratios in the gearbox 23 were equally-spaced, then the other shift lines 50 and 51 would also become straight. (Other factors can cause this procedure to straighten every shift line even if not all ratio gaps are equal. One such factor is using the engine 51 in place of the engine 10.) My U.S. patent application filed on Sept. 3, 1985, and assigned Ser. No. 771,660 considers this and other alternative methods for generating and using the gear ratio selection map of FIG. 5. This pending patent application Ser. No. 771,660 is incorporated herein by way of reference.

Allowing hypothetical number of equally-spaced gear ratios in the gearbox 23 to approach infinity produces some interesting results. First, the artificial-maximum-BMEP engine operating schedule that relates the vertical scales of commanded power and commanded engine RPM to each other in FIG. 5 becomes the operating schedule of minimum brake specific cost for operation of the engine 10 throughout its crankshaft speed range. Which is to say that the relationship between commanded power and commanded engine RPM would be that given by the point of minimum brake specific cost on curve 43 in FIG. 2 and by all such minimum points throughout the crankshaft speed range of the engine 10. Furthermore, the optimum geabbox ratio can be calculated simply as the ratio of commanded engine RPM to measured gearbox output RPM. Consequently, the data directly relevant for optimum operation of a powertrain employing a CVT (continuously variable transmission) is not the gear ratio selection map of FIG. 5, but rather commanded crankshaft RPM as derived from power output commanded through the accelerator pedal 17 and from the engine operating schedule of minimum brake specific cost; this data would constitute the CVT engine operating schedule for the engine 10. Going even further, CVT ratio is usually best controlled to eliminate an error signal of the difference between commanded engine RPM and actual engine RPM as measured by a sensor. These and other aspects of CVT drive-by-wire control are considered in more detail in my pending U.S. patent application Ser. No. 689,185, filed Jan. 7, 1985, which is incorporated herein by way of reference.

Gear Selection Data for Alternative Types of Discrete-Ratio Transmissions

The fluid coupling assembly 21 and 4-speed powershift gearbox 23 together constitute a powershift transmission that further combines with the engine 10 to form a power unit. This power unit has four distinct operating modes, the performance of each of which may be closely approximated using stationary dynamometer data obtained by testing the engine 10 alone. In other words, the four different gear ratios in the gearbox 23 all achieve high efficiency of power transmission so long as the fluid coupling lock-up clutch 35 is fully engaged. Since the engagement schedule that will be explained for the lock-up clutch 35 is in fact very extensive, the map of optimum gear selection for the gearbox 23 can be successfully generated, as already explained with reference to FIG. 5, without accounting for the substantial power that is dissipated in the fluid coupling assembly 21 during a brief, initial stage of acceleration of the associated passenger car. In contrast, the torque converter in some automatic transmissions remains intermittently active to help bridge the gap between gear ratios that are widely spaced to achieve a wide overall ratio range.

Now considering such wide-ratio automatic transmissions, the torque converter lock-up clutch in heavy-duty diesel truck transmissions often passes through one complete cycle of release and engagement for each upshift completed in sequence. Release accompanies the upshift itself, and the subsequent engagement serves to split the ratio gap much as would a 2-speed drive axle. Unlike a 2-speed axle, however, a torque converter cannot multiply torque without incurring a significant loss in the efficiency of power transmission. Consequently, two complete sets of stationary dynamometer test data are necessary for successful application of an overall procedure like the one explained with reference to FIG. 5.

Both of these complete sets of data in a sense apply to the engine and torque converter operating together as a unit, one set for operation with the converter lock-up clutch fully engaged and the other for operation with the lock-up clutch released. The set of data for operation with the lock-up clutch fully engaged can obviously be obtained by dynamometer testing onlY the engine in exactly the same manner as already described with reference to FIG. 2. In actual practice, the other (engine-converter) set of data is most easily obtained by combining the engine-only dynamometer results represented by FIG. 2 with dynamometer results obtained by testing the torque converter alone. The combined engine-converter data will follow exactly the same form as the engine-only data, but output power and output RPM will now apply only to the torque converter output shaft, rather than to either the converter output shaft or the engine crankshaft (as it does when the lock-up clutch 35 is fully engaged).

Returning again to FIG. 2, the generation of engine-converter data curves corresponding to the curves 40, 41, 42 and 43 will now be described. To begin, FIG. 2 will no longer apply to constant crankshaft RPM, but instead to constant RPM of the torque converter output shaft, which directly drives the input shaft of the associated powershift gearbox. At any particular lateral position on a particular engine-converter data plot like FIG. 2, dynamometer data from testing the torque converter by itself is applied to the particular converter output values of power and RPM to yield the converter input values of the same parameters. Since these converter input values of power and RPM are identical to engine crankshaft power and RPM, they are used to consult the appropriate engine-only data plot like FIG. 2. (Crankshaft RPM locates the particular engine-only plot like FIG. 2, and crankshaft power locates the lateral position on that plot.) At this point, power transmission efficiency of the torque converter may be calculated from the input and output values of power. Next, engine values of throttle position, EGR valve position and fuel injection pulse width are taken from the particular engine-only data plot and transferred directly to the original lateral position on the engine-converter data plot. BSFC is, in contrast, no longer an engine value, but must be modified to describe the performance of the engine and torque converter operating as a unit. Consequently, BSFC (or brake specific cost) is transferred to the engine-converter data plot only after it is multiplied by the reciprocal of the current power transmission efficiency of the torque converter. The rest of the engine-converter plot like FIG. 2 is generated by repeating the foregoing procedure in its entirety using the original converter output RPM over the range of converter ouput power from zero to the maximum available at the original converter output RPM.

The foregoing method for generating an engine-converter data plot modeled after FIG. 2 is best implemented by a computer subroutine. This subroutine is repeatedly applied over a progression of representative torque converter output shaft speeds of the engine and torque converter operating together as a single power-producing unit. The result of this repeated application is of course four new three-dimensional data surfaces located above the plane of brake power output available at the torque converter output shaft versus operating RPM of the converter output shaft. As in the case of engine-only data surfaces, there is one surface for each of engine throttle position, engine EGR valve position, engine fuel injection pulse width, and the brake specific cost of operating the power unit.

These engine-converter data surfaces have a few interesting characteristics. Most notably, as the torque converter output shaft RPM approaches the crankshaft RPM at which the engine develops its maximum wide-open-throttle power output, the torque and power available at the converter output shaft approach zero. High values of output power, and especially of torque, are available at the converter output shaft only when the converter output RPM is distinctly below the crankshaft RPM of maximum engine power output. Next, the three-dimensional engine-converter data surfaces are like the engine-only data surfaces in that they do not encompass areas where unacceptable engine operation would occur; here, relevant considerations include autoignition, NVH (greatly moderated by the torque converter) and crankshaft speed beyond the RPM at which the engine develops its maximum power output. And last, brake specific cost is the only data parameter useful at converter output shaft speeds below the normal engine idle RPM. At these low speeds, an extremely high but finite value of brake specific cost will ensure that operation with the converter lock-up clutch released is selected for near-zero vehicle speeds. (Engine-only brake specific cost data does not extend below the normal engine idle speed).

Only a few details of the overall method for computer generation of a map of gear selection data similar to FIG. 5 need modification in order to accomodate the case where a torque converter lock-up clutch is cycled to help bridge gearbox ratio gaps. Most obviously, the candidate RPM values calculated from gearbox output RPM and gearbox gear ratios now become candidate speeds for the torque converter output shaft. Since the converter lock-up clutch can be either released or engaged, each candidate converter output speed will further include two candidate powertrain operating modes. Exactly the same criteria as explained prevhously are used to eliminate unacceptable powertrain operating modes, and the remaining candidate powertrain modes are compared for minimum BSFC or brake specific cost in the manner previously explained with reference to FIG. 5. Engine-only data provides the BSFC or brake specific cost of operation in any gearbox ratio with the converter lock-up cl.tuch engaged, and the additional engine-converter data serves operation in any gearbox ratio with the lock-up clutch released. Also worth mentioning is the fact that considerations in addition to brake specific cost can influence selection of the optimum powertrain operating mode. For instance, the 1st and 2nd gear ratios of a 5-speed gearbox might be limited to operation with the converter lock-up clutch released to thereby somewhat increase vehicle operating smoothness as well as life of the lock-up clutch.

Splitting gear ratio gaps by cycling the engagement of a torque converter lock-up clutch will clearly alter the appearance of data like FIG. 5. Because of the inefficiency inherent in torque converters, most powertrain operating modes obtained with the lock-up clutch released will be restricted to the areas of high engine power output inaccessible with the lock-up clutch engaged. As a direct consequence, sufficiently narrow ratio gaps will eliminate many areas dedicated, on a map like FIG. 5, to operation with the lock-up clutch released. Any small remaining areas are often best eliminated entirely in the interest of vehicle driveability.

In passenger car use, smooth gear shifts can have more importance than does completely optimized fuel economy. Although an unlocked torque converter will smooth gear shifts, the preferred approach is to secure acceptable smoothness through refinement of the associated powershift gearbox. Even so, the following modifications of the method associated with FIG. 5 may be used when an unlocked torque converter is relied upon to enhance shift smoothness. Since upshifts are usually more difficult to accomplish smoothly than are downshifts, operation in certain transmission ratios with the torque converter locked up will be reached only through a downshift. Stated in another way, the complete schedule for sequential downshifting will include at least one lock-up gear ratio not included on the complete schedule for sequential upshifting. (Engagement of the lock-up clutch without shifting gear ratios is treated as an upshift, and release as a downshift.) It is this feature of two shift schedules which requires modification of the method explained with reference to FIG. 5. The primary modification is to use the method of FIG. 5 to generate two separate maps for selection of he optimum transmission operating mode, one map for upshifts and a different map for downshifts.

In more detail, certain gearbox ratios will be acceptable for use with the torque converter locked up, but require that the converter be unlocked upon initiation of an upshift. These lock-up ratios are included in the downshift map, but treated as unavailable for computer generating the upshift map. Because the maps are not identical, the optimum transmission operating modes determined from the two maps will not always coincide. If not, the downshift map will always have priority except when the need for an upshift from the existing transmission mode is indicated by both shift maps. In addition, control of the torque converter lock-up clutch must include provision for releasing the clutch whenever an upshift is initiated from one of the lock-up ratios not included on the upshift map.

Another alternative type of transmission uses different split-power-paths to pass various percentages of engine output power through the associated torque converter. In a hypothetical example, 1st gear passes all of engine power through the torque converter, 2nd gear passes the majority of power through the converter, 3rd gear passes only a minority of power through the converter, and 4th gear by-passes all power around the converter. In such a situation, the entire combination of the engine and transmission replaces the engine 10 in the overall dynamometer test procedure represented in part by FIG. 2. This overall test procedure is completed in its entirety once for each of the four transmission ratios, but each data plot like FIG. 2 would now be referenced to a particular RPM value of the transmission output shaft. This new referencing allows the optimum gear ratio map like FIG. 5 to be determined with no need to calculate candidate engine speeds. (As in the previous case of engine-only and engine-converter data, a procedure exists for deriving all of the required data from dynamometer data obtained from the engine alone and from the torque converter alone).

Just as the transmission in a powertrain can require additional dynamometer data such as engine-converter data, so too can the engine in the powertrain spawn additional powertrain operating modes. To introduce an example of this, valve-selector systems have in the past been used on passenger car engines to selectively disable the valve-opening apparatus of certain cylinders of the engine. While such systems did lack complete refinement, they aided fuel economy by both reducing engine air pumping loss and improving burn rate under light torque loads. In order to incorporate a valve-selector system in the engine 10 of FIG. 1, the dynamometer testing procedure described herein for the engine 10 would be completed for each engine operating mode made possible by the valve-selector system.

Drive-by-Wire Control System

Figure 6:
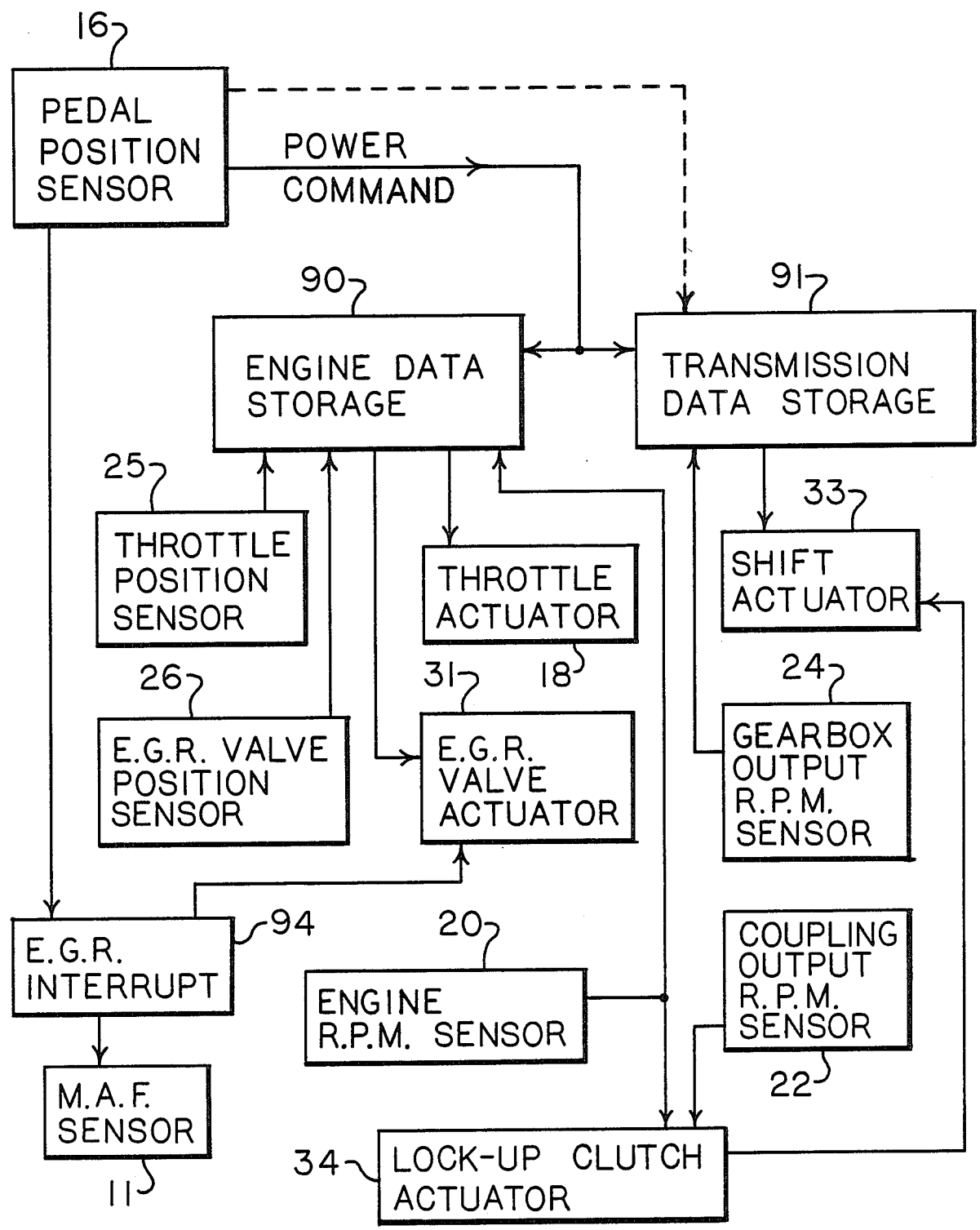
FIG. 6 is a block diagram of the drive-by-wire control system of FIG. 1.

FIG. 6 of the drawing presents a block diagram showing the drive-by-wire control system 15 and its associated sensors and actuators in more detail than is included in FIG. 1 for these particular components. Turning now to FIG. 6, the more essential construction and operating features of the control system 15 will be explained first, and ancillary details later.

Beginning with the sensor 16 for position of the accelerator pedal 17, the position signal from the sensor 16 is in reality the command signal for power output to be provided at the power output shaft of the gearbox 23 for the purpose of propelling the associated passenger car. The pedal position sensor 16 provides this power command signal as an input signal to each of two main memory-and-control units 90 and 91 within the digital electronic control system 15. One of these memory-and-control units, the engine data storage and control unit 90, contains in read-only-memory the three engine-only data surfaces which intersect the plane of FIG. 2 along the curves 40, 41 and 42. The other memory-and-control unit, the transmission shift selection data storage and control unit 91, contains in its read-only-memory the entire map of gear selection data as described with reference to FIG. 5 for the engine 10 and gearbox 23.

In order that the transmission shift data storage unit 91 can use a suitable known technique to address the data of FIG. 5 stored in its read-only-memory (ROM), an input signal indicating the existing power output shaft speed of the gearbox 23 is needed in addition to the power command input signal from the sensor 16. The RPM sensor 24 therefore supplies its signal for the actual output shaft speed of the gearbox 23 to the transmission data storage unit 91. With the ROM storage address of the optimum gear ratio in the gearbox 23 thus determined, the transmission data unit 91 does retrieve from its ROM a code for the gear ratio in the gearbox 23 that is currently the best of the available ratios. The gearbox shift actuator 33 receives a corresponding signal from the unit 91 and enables the currently optimum ratio in the gearbox 23. As is characteristic of computer control in passenger cars, the transmission data unit 91 repeats this gear ratio optimization process many times each second. In fact, both of the data storage and control units 90 and 91 can be incorporated into a single digital electronic module which also carries out many other conventional engine and transmission control functions.

Within the engine speed constraints imposed by the choice of gear ratios available in the gearbox 23, the shift actuator 33 enables the gear ratio optimum for minimized brake specific cost of operating the engine 10 at the commanded power level while the associated passenger car travels at its existing speed. Changes in either or both of commanded power output and vehicle speed can therefore necessitate shifting to a different one of the areas 55, 56, 57 and 58 in FIG. 5 and thus to a new optimum ratio in the gearbox 23. As just one example of this, even a small increase in a relatively modest level of power commanded through the accelerator pedal 17 can initiate a downshift of the gearbox 23. As another example, increasing vehicle speed can obviously require an upshift of the gearbox 23. Nevertheless, the engine 10 will not develop the commanded power level unless the engine data storage and control unit 90 also performs its function.

This engine data storage unit 90 in effect continuously selects from its ROM the data plot which is like FIG. 2 and which is current for the existing crankshaft speed of the engine 10 as measured by the engine RPM sensor 20. So the signal from the RPM sensor 20 is delivered to the engine unit 90 as one of two primary input signals, the other being the power command signal from the sensor 16. Using these primary inputs to address its ROM data for the engine 10, the engine unit 90 in effect enters the current data plot like FIG. 2 at the lateral position dictated by the power command signal from the sensor 16. Among the values thus retrieved from ROM data for the engine 10 are the particular positions of the engine throttle 12 and EGR valve 27 that will in combination best achieve the commanded power output at the existing crankshaft speed of the engine 10. Fuel injection pulse width can also be stored in and retrieved from the ROM data, but this would be expected pulse width because actual pulse width is determined by the mass air flow sensor 11 acting in conjunction with the exhaust gas oxygen sensor included in the engine assembly 10.

For comparison to the optimum position of the engine throttle 12 as retrieved from ROM data, the engine data unit 90 receives a feedback signal indicating the actual position of the throttle 12. The throttle position sensor 25 provides this feedback signal, and the engine unit 90 activates the throttle actuator 18 to thereby eliminate any difference between the optimum and actual positions of the throttle 12. In taking this comparison-and-correction action, the engine data unit 90 utilizes known techniques for proportional, integral and derivative feedback control of the throttle 12 through the actuator 18. Similarly, the engine data unit 90 exercises proportional, integral and derivative feedback control of the EGR valve 27 to thereby equalize the actual position of the valve 27 to the optimum position as continuously retrieved from the ROM data for the engine 10. The EGR valve position sensor 26 provides the engine unit 90 with the necessary feedback signal for actual position of the EGR valve 27, and the EGR valve actuator 31 makes the actual adjustments in position of the EGR valve 27.

Even if the engine 10 were replaced by the supercharged engine 51 of FIG. 3, the sensor-actuator pair of components 25 and 18 would still interface with the engine data unit 90 to provide control of the engine throttle 12, but according to ROM data for the supercharged engine 51. The EGR control components 26 and 31 would, in contrast, be replaced in FIG. 6 by the supercharger by-pass valve control components 55 and 56 from FIG. 3. In the case of the other supercharged engine 60 from FIG. 4, the engine data storage unit 90 would regulate the brake torque output of the supercharged engine 60 by interfacing with four, rather than with two sensor-actuator component pairs. As yet another example, the data storage unit 90 would interface with only one pair of sensor-actuator components in the case of a conventional Diesel truck engine.

Another example of variations in the control system components of FIG. 6 is suggested by realizing that the engine data unit 90 functions in what is actually the command side of the overall position control of the engine throttle 12 and of the EGR valve 27. This approach is preferred for its comparative simplicity and because it enhances proportional-integral-derivative control of the valves 12 and 27. Even so, the arrangement of FIG. 6 could be modified to place the engine data unit 90 in the feedback side of the overall control for the valves 12 and 27. In such a modification, the engine throttle 12 would, for example, be adjusted not in response to command and feedback values of its own position, but rather in response to command and feedback values for power produced by the engine 10. In other words, the engine unit 90 could retrieve from its ROM engine data a value of power output currently being produced by the engine 10 based on the measured crankshaft RPM signal from sensor 20 and on the measured position signals from the throttle position sensor 25 and the EGR valve position sensor 26. This indirectly measured power output value from ROM data would serve as a master feedback signal to be equalized with the power command signal from the pedal position sensor 16. Appropriate adjustments of the valves 12 and 27 would achieve the equalization.

So a multitude of variations in the control system of FIG. 6 centers on just the engine data storage and control unit 90. Nevertheless, all of these variations of the present invention will be operative to accomplish two things. First, the brake torque output developed by the engine 10 will be regulated to the value necessary, at the existing crankshaft speed of the engine 10, to provide the power output currently being commanded by the accelerator pedal sensor 16. Second, the combination of particular positions of the valves 12 and 27 will be in accord with operation of the engine 10 at minimum brake specific cost as explained with reference to FIG. 2. Thus, the control system of FIG. 6 plays a key role in the preparation of the intake charge consumed by the engine 10. In addition then, the data surfaces, of which the curves 40 and 41 are a part, together constitute a calibration for optimized operation of the engine 10.

Another multitude of variations within the scope of the present invention centers on the transmission shift data storage and control unit 91. Each of these variations is operative to select, from among the gear ratios available in the gearbox 23, the ratio which will incur the lowest brake specific cost of operating the engine 10 to produce the power currently being commanded by the accelerator pedal sensor 16 while the associated vehicle is traveling at its existing speed. As just one example of these variations, the map of FIG. 5 could be discarded in favor of continuous comparison of the brake specific costs of candidate powertrain operating modes.

The control system of FIG. 6 operates as explained to automatically impose on the engine 10 the EGR calibration of which the curves 40 and 41 in FIG. 2 are only a small part. During transient conditions, it can be especially difficult for the throttle actuator 18 and the EGR valve actuator 31 to adhere to this calibration. Consequently, the EGR actuator 31 should have a faster maximum closing rate than does the throttle actuator 18 because the mass air flow sensor 11 can accomodate too little EGR (and even overshoot of the EGR actuator 31 upon closing) simply by increasing the fuel injection pulse width; but too much EGR can cause misfire of the engine 10. For this same reason, the maximum opening rate of the EGR actuator 31 should be less than that of the throttle actuator 18.

The following is just one of many ways in which subcomponents of the EGR actuator 31 can be selected and arranged to secure for the EGR valve 27 the desired combination of a relatively fast closing rate with a relatively slow opening rate. A source of constant vacuum would be applied through a fixed-area orifice to a diaphragm, which would in turn open the EGR valve 27 against the force of an integral spring. This first orifice would consequently be sized to limit the maximum opening rate of the EGR valve 27 to significantly less than that of the engine throttle 12. In contrast, full opening of a comparatively large variable-area orifice venting the diaphragm vacuum chamber to atmosphere would allow the diaphragm spring to close the EGR valve 27 very rapidly. The engine data unit 90 would of course employ an electric solenoid to regulate the variable area of the bleed orifice, which would be opened by spring force.

Moving now to the less basic components shown in FIG. 6, the lock-up clutch actuator 34 electronically compares input shaft and output shaft speeds of the fluid coupling assembly 21. If the output shaft speed of the coupling 21 is above both the idle speed of the engine 10 and a threshold percentage of the existing input shaft speed of the coupling 21, then the actuator 34 will engage the lock-up clutch 35. The threshold percentage for lock-up is selected for acceptable engagement smoothness, and the threshold percentage may vary, using ROM space, as a function of crankshaft speed of the engine 10. If, on the other hand, the crankshaft speed of the engine 10 threatens to fall below its idle value, then the actuator 34 will release the lock-up clutch 35. To allow the actuator 34 to accomplish these engagement and release functions, input signals from the engine RPM sensor 20 and the coupling output RPM sensor 22 are supplied to the actuator 34. The input signal from the engine RPM sensor 20 of course also indicates input shaft speed of the fluid coupling 21.

Also shown in FIG. 6 is a lock-up signal delivered from the lock-up actuator 34 to the gearbox shift actuator 33. In response to this lock-up signal, the shift actuator 33 will upshift the gearbox 23 only after the lock-up clutch 35 is engaged. The lock-up schedule for the fluid coupling assembly 21 is, as a result, very extensive and normally encompasses part of 1st gear and all of the remaining three gear ratios in the gearbox 23. Other variations of the present invention may not require a lock-up signal; examples of this are provided by some of the variations using both engine-only data and engine-converter data.

The power dissipated in the fluid coupling assembly 21 when its lock-up clutch 35 is released inherently provides a needed reduction in power delivered to the gearbox 23 when the associated passenger car is first accelerated from a stop. Further reduction may be needed and can be acquired in several ways. For instance, the power command signal from the sensor 16 can be attenuated at low vehicle speed as measured by the RPM sensor 24 for output shaft speed of the gearbox 23. However, opening of the throttle 12 should remain accentuated at very low vehicle speed to help duplicate the low speed response of a conventional powertrain using a torque converter in place of the fluid coupling 21. The fluid coupling 21 does improve efficiency both directly and indirectly in comparison to a lock-up torque converter because the much closer matching of input and output speeds in a fluid coupling also allows earlier lock-up clutch engagement.

While the error in engine power output that results from fluid coupling slippage only benefits the powertrain components of FIG. 1, the same is not true of other variations of the present invention. If a torque converter is used in conjunction with engine-only and engine-converter data for the purpose of bridging widely-spaced gearbox ratios, then the error in power output will still benefit the associated vehicle during acceleration from a complete stop. At all other times, though, the engine data storage unit like the unit 90 should regulate engine torque output in response to the measured RPM of the torque converter output shaft, not the RPM of the engine crankshaft. Therefore, some variations of the present invention require that the RPM feedback signal supplied to the engine data storage unit like unit 90 be appropriately switched between crankshaft speed and torque converter output speed.

The last remaining component in FIG. 6, the EGR interrupt device 94, serves its primary purpose only when the driver commands maximum power output by depressing the accelerator pedal 17 fully. At this time, the interrupt device 94 sends an override signal causing the EGR actuator 31 to fully close the EGR valve 27.

The interrupt device 94 concurrently sends a signal causing the mass air flow signal generated by the mass air flow sensor 11 to be multiplied by a factor that will provide suitable full-power enrichment of the air-fuel charge consumed by the engine 10. This enrichment requires "open loop" operation of the exhaust oxygen sensor, and it serves to suppress autoignition as well as to further increase engine power output. The force of an extra spring should oppose only the last increment of movement of the accelerator pedal 17 so that the driver can easily distinguish between the absolute maximum power and the maximum power available with the fuel economy benefit of EGR.

As a secondary function, the EGR interrupt device 94 can reduce or eliminate EGR following a cold start of the engine 10. At the same time when EGR is reduced for cold engine operation, the gearbox 23 can be allowed to follow its normal shift schedule, but with the lock-up clutch 35 always released to improve cold-engine driveability and to help offset the higher engine torque produced with lower EGR. (Slippage in the fluid coupling 21 causes the engine data storage unit 90 to counteract the extra crankshaft speed by reducing the opening of the throttle 12.)

Turning now to secondary considerations for some of the components of FIG. 6, the engine data storage and control unit 90 can store engine dynamometer data that is slightly altered to permit engine braking. As shown in FIG. 2, actual engine power output will in general reach zero before the throttle 12 reaches its idle position, but the throttle actuator 18 should preferably return the throttle 12 to its idle position whenever the accelerator pedal 17 is fully released. Since the released position of the pedal 17 commands zero power output, the throttle position curve 40 in FIG. 2 should be extended to idle position and zero power assigned to that position even though the actual power output there will be negative. Assigned values of power output will then increase with throttle position to join the curve of actual power output at some quite small power level on the curve of actual power. The very low power levels of all throttle position curves like the curve 40 should be altered in this way.

Another extension occurs at the other end of the curves 40 and 41 for position of the throttle and EGR valves. At this end of the curves, the accelerator pedal position sensor 16 can suddenly command maximum power output when the engine 10 is operating at any crankshaft speed. Therefore, the horizontal axis of each data plot like FIG. 2 must extend to the maximum power output commanded by the sensor 16. On these extensions, all curves like the curves 40, 41, 42 and 43 remain constant at values for the highest brake torque condition measured during dynamometer testing for FIG. 2 and free of both autoignition and unacceptable NVH. Unlike extension of the curves to allow engine braking, these other extensions are essential additions to the data stored in the ROM of the engine data storage and control unit 90.

As suggested earlier, inclusion of curve 42 and other such pulse width curves in the ROM of the engine data unit 90 is not required, but will provide a usable pulse width in the event of failure of the MAF sensor 11. Comparison of the expected pulse width to the actual pulse width can also serve to detect operational faults such as sticking of the EGR valve 27 or excessive exhaust back pressure.

Moving now to the other main ROM data storage unit, the transmission data storage and control unit 91, the optimum gear selection data of FIG. 5 includes no provision to protect against oscillating shifting of the gearbox 23. The following is just one of the many techniques that will introduce the necessary hysteresis into the shift schedule enforced by the transmission data unit 91. The unit 91 will still determine the need for upshifts of the gearbox 23 exactly as already explained, but only the need for downshifts is to be determined using a feedback value about 5% in excess of the actual output shaft speed of the gearbox 23. Selective amplification of the feedback signal from the RPM sensor 24 will provide the desired hysteresis and also prevent the engine 10 from fully reaching its maximum crankshaft speed as the immediate result of a downshift.

A further refinement of the transmission data unit 91 again relates to shift frequently and again offers many methods by which it can be achieved. One particularly good approach first recognizes that only upshifts of the gearbox 23 can be consistently delayed without incurring an unnecessary error between actual and commanded values of power output. The next realization is that an upshift is not likely to be closely followed by an offsetting downshift unless the upshift occurs in response to a decrease in commanded power output. So delaying upshifts for several seconds will reduce shift frequency, but such delays should be restricted to upshifts caused by a distinct release in position of the accelerator pedal 17. This technique is represented in FIG. 6 by a dashed input line from the accelerator pedal sensor 16 to the transmission control unit 91.

As implied previously, the engine data unit 90 must employ appropriate modifications in order to accomodate variations in the hardware of FIG. 1. If the fluid coupling 21 were replaced by a lock-up torque converter in turn used to bridge increased gaps between gear ratios in the gearbox 23, then the engine data unit 90 would store complete engine-converter data as well as complete engine-only data. In addition, the engine data unit 90 would consult the proper set of data depending on whether the torque converter clutch were locked or unlocked. The required input signal from the lock-up clutch actuator 34 to the engine data unit 90 is not shown in FIG. 6 because adding more gear ratios to the gearbox 23 is the preferred way of achieving a wide overall ratio range. (The gearbox 23 does not have more than four forward gear ratios only because 3-speed and 4-speed powershift gearboxes are now the norm for passenger cars.)

In the case where a torque converter without a lockup clutch would transmit a different percentage of engine power for each gear ratio, every complete set of data stored in the engine data unit 90 would be referenced to the speed of the transmission output shaft. Obviously then, the engine data unit 90 would receive its primary RPM feedback signal only from the RPM sensor 24, rather than from the engine RPM sensor 20 or the coupling output RPM sensor 22. This approach can be used for many other transmission types, but it is not preferred in the case for which one set of data differs from another only by a constant RPM scaling factor. (As an example of this, engine-only data for the engine 10 can provide a very good approximation of the 2nd gear powertrain performance available at the power output shaft of the gearbox 23 with the lock-up clutch 35 engaged. All that is necessary is to scale the crankshaft RPM of the engine-only data by dividing the crankshaft RPM by the speed ratio of 2nd gear in the gearbox 23. Performance available using the other speed ratios in the gearbox 23 is similarly obtained by appropriately scaling the engine-only data. Thus, as an alternative to the approach already explained for drive-by-wire control of the powertrain components of FIG. 1, one complete set of scaled data would be stored in the engine data unit 90 for each of the four speed ratios available in the gearbox 23. Each of these four sets of data would be referenced to the gearbox output RPM as measured by the RPM sensor 24, and the engine data unit 90 would consult the correct set of data depending on the speed ratio currently being used to transmit power through the gearbox 23. While this alternative approach can be more broadly applied, it is more costly to implement than is the approach already explained with reference to FIG. 1).

Finally, the form which the shift actuator 33 will take depends on design details of the powershift gearbox 23. For instance, the shift actuator 33 can be of a type that will shift out of sequence only if the gearbox 23 can change gear ratios out of sequence. In general though, the shift actuator 33 can follow conventional practice by incorporating one hydraulic spool valve for each sequential pair of gear ratios between which upshifts and downshifts are completed. Each of these spool valves would be shuttled by two electrical solenoid valves with which the spool valve would combine to form an electro-mechanical flip-flop. Since the mechanical state of each spool valve would be indicated by its electrical state as a flip-flop, a separate communication channel to indicate the existing gear ratio of the gearbox 23 would be unnecessary. If, on the other hand, a continuously variable transmission were to replace the discrete-ratio gearbox 23, then the transmission data unit 91 would need a separate feedback signal related to the existing transmission ratio, but not shown in FIG. 6. If a manualy-shifted transmission were to replace the automotically-shifted gearbox 23, then the shift actuator 33 would become a visual display for indicating the optimum gear ratio to the driver, who would be relied upon to enable the optimum gear ratio selected by this variation of the present invention.

Theory of Operation for Optimized Fuel Economy

Although the most fuel efficient operation of the engine 10 requires that its throttle valve 12 be effectively wide open, the reasons for this maximized efficiency can be conveniently explained by first considering part-throttle operation of the engine 10 at constant crankshaft speed. This explanation also requires the hypothetical modification of adding recirculated exhaust gas upstream, rather than downstream, of the throttle 12. In addition, the fuel injection system of the engine 10 is assumed to always operate in "closed loop" mode to thereby always inject fuel in stoichiometric proportion to the combustion air being consumed by the engine 10.

With both engine speed and a partly-open position of the throttle 12 now holding fixed values, the brake torque output of the engine 10 will depend only on its EGR rate. In contrast, engine frictional and air pumping losses will remain essentially independent of EGR rate, and indicated engine torque will equal the sum of a variable torque applied by the dynamometer brake plus a constant parasitic torque magnitude for the sum of engine friction and pumping losses. Since fuel must be consumed to overcome both of these components of indicated torque, higher brake torque reduces the percentage of fuel being consumed to overcome the constant parasitic component of indicated torque. So the mechanical efficiency of the engine 10 will be greatest when EGR reaches zero. On the other hand, EGR dilution of the fuel-air mixture reduces engine combustion temperature to thereby enhance three of the four major aspects of thermal efficiency of the engine 10. The best compromise between engine mechanical losses and engine thermal losses is therefore manifested in the EGR rate which minimizes BSFC. It is emphasized that this BSFC is minimum for the original fixed values of throttle position and crankshaft speed, but not minimum for the combination of the resulting rate of fuel flow to the engine and the original fixed crankshaft speed.

Like a reduction in EGR rate, a throttle opening greater than the original fixed value can reduce engine mechanical losses by allowing an increase in brake torque output. But unlike a reduction in EGR rate, a larger throttle opening need not increase combustion temperature in order to increase brake torque. (Heat transferred to the engine cooling jackets best exemplifies the degradation of engine thermal efficiency that accompanies an increase in combustion temperature.) As a direct consequence, a better compromise between engine mechanical losses and engine thermal losses can be obtained at the larger throttle opening. Going now to the logical conclusion, the minimum BSFC of the engine 10 at a particular crankshaft speed requires that the throttle 12 be effectively wide open. Furthermore, the preceding considerations are independent of engine crankshaft speed, with the result that the engine 10 can return quite low BSFC values throughout a broad power range provided that (1) the throttle 12 is always effectively wide open, (2) MBT spark timing is continually maintained over most of the engine speed range and (3) the EGR rate follows its schedule for optimum wide-open-throttle engine efficiency. In addition, the preceding considerations also apply to alternative intake charge dilutants, for example, the excess air of lean combustion.

Only a continuously variable transmission (CVT) could accurately follow a predominantly wide-open-throttle (WOT) engine operating schedule to thereby take full advantage of operating the engine 10 at WOT with its EGR rate optimized for fuel economy. On the broad WOT portion of the engine operating schedule, the CVT would provide primary control of engine power output. Which is to say that only a small excess of power in comparison to the value currently commanded via the accelerator pedal would initiate a correspondingly small increment of upshift of the CVT, and only a small debit in power would initiate an increment of downshift. If exactly this same control approach were used with the discrete-ratio gearbox 23, then the original gear shift would of course grossly overcompensate for the original, small error in power. A totally unacceptable oscillation between upshifting and downshifting would ensue, and such oscillation would be extremely prevalent.

The drive-by-wire control components of FIG. 6 can be viewed as actually following the same control approach that would be used with a CVT, but with hysteresis added to avoid oscillating shifting. Thus, the powertrain components of FIG. 1 operate to approximate the CVT engine operating schedule for the engine 10 as closely as is allowed by the gear ratios available in the gearbox 23.

FIG. 5 then is actually a representation of the shift schedule hysteresis necessary to exclude all oscillating shifting of the gearbox 23 which would otherwise spontaneously occur at constant speeds and road loads of the associated passenger car. This hysteresis is herein defined as "ratio gap hysteresis." Slight additional hysteresis enhances the performance of the control system components of FIG. 6 because, for example, the increased vehicle speed resulting from a downshift can almost immediately require an offsetting upshift. This additional hysteresis, if represented in FIG. 5, would appear as narrow strips adjacent the lines 50, 51 and 52. The optimum gear ratio within each of these strips would alternate between two gear ratios, depending on the gear ratio currently being used in the gearbox 23. All such additional hysteresis is herein defined to be "control system hysteresis."

If the drive-by-wire feature of the present invention were omitted, then the control system hysteresis necessary to prevent unacceptable shifting of the gearbox 23 would increase dramatically from a relatively small value to a value easily rivaling the ratio gap hysteresis. To take a more direct viewpoint, drive-by-wire control by itself accounts for a major portion of the fuel economy benefit that would be afforded to the specially-calibrated engine 10 by the combination of drive-by-wire control with a wide-ratio CVT. However, drive-by-wire control offers its benefit with virtually no attendant technological risk, but the same is now clearly untrue for the wide-ratio CVT. While use of the CVT appears to be eminent for some in the class of small cars which are already quite fuel efficient, fuel economy of larger, more powerful cars is presently the real issue. It is for these cars that a practical CVT is more doubtful and in these cars that 4-speed powershift gearboxes are already widely used.

The reduction in control system hysteresis made possible by drive-by-wire control will not always be so significant. Because both control system hysteresis and ratio gap hysteresis approach zero as the transmission ratio gaps approach zero, drive-by-wire control offers no corresponding fuel economy advantage in the case of a CVT, but it still offers driveability and other advantages. The shape of the optimm, or CVT engine operating schedule also influences the amount of the total shift schedule hysteresis which drive-by-wire control can by itself nullify.

On the requisite plot of BMEP versus crankshaft speed, the CVT engine operating schedule for the engine 10 displays an initial rapid rise in BMEP, and then more or less of a plateau of relatively high BMEP extending over a broad engine speed range. This plateau of BMEP offers high fuel economy, but with typical 4-speed ratio gaps it also requires the control system to employ either the drive-by-wire principle or a high level of control system hysteresis. Only the former will actually allow engine operation sufficiently close to the BMEP plateau.

During engine operation on a BMEP plateau, even a slight release of the accelerator pedal can initiate an upshift from 3rd gear to 4th gear overdrive. Without drive-by-wire control, the resulting decrease in engine speed would often force the driver to offset the loss in engine speed with an increase in BMEP. While this offsetting increase is secured automatically with drive-by-wire control, the more conventional approach requires that the driver further depress the accelerator pedal. In so doing, the driver will move to a higher power level along the CVT engine operating schedule. On a BMEP plateau, however, even a slight BMEP increase will most often correspond to an astronomical increase in crankshaft speed. This astronomical increase in commanded engine speed will in turn cause an immediate offsetting downshift unless control system hysteresis is also astronomically large. (In this case, oscillating shifting clearly is not spontaneous, but results when the driver attempts to obtain a level of power output available only as an average during oscillating shifting.). Consequently, only drive-by-wire control is always compatible with an engine operating schedule which features a BMEP plateau. Since the engine 10 does have a broad BMEP plateau, a kind of synergism thus exists between drive-by-wire control and the combination of the specially-calibrated engine 10 with the 4-speed powershift gearbox 23.

Factors which reduce the fuel economy advantage afforded by drive-by-wire control have already been noted, but certain applications can accentuate the advantage. Perhaps the best example is alternating-current generators driven at constant speed, but subjected to a widely varying electrical power demand. Spark-ignition engines, such as the supercharged engine 51, can often be much more than competitive for such applications if an inexpensive gaseous fuel is available. In accordance with the present invention, a simple 2-speed powershift gearbox would be interposed between engine and generator. Due to a wide ratio gap in the 2-speed transmission, the drive-by-wire principle would be an even bigger fuel economy advantage than for the automotive powertrain components of FIG. 1. (Here the shift map represented by FIG. 5 would decay into a single commanded power level separating the two gear ratios, and an added stage of feedback control would command the power output necessary to maintain constant generator speed.)

Returning now to part-throttle operation of the engine 10 with EGR added upstream of the throttle 12 and with crankshaft speed being fixed, a question arises with regard to minimum BSFC at constant throttle opening versus minimum BSFC at constant fuel injection pulse width. Beginning with constant throttle opening, an increment of EGR added at the minimum BSFC will reduce combustion temperature, but at the expense of engine mechanical efficiency. Since the curve of BSFC versus EGR rate is nearly horizontal in the vicinity of the minimum BSFC, the reduction in combustion temperature must improve engine thermal efficiency by more than the reduction in burn rate, due to added EGR, degrades thermal efficiency. (Lower combustion temperature reduces heat losses to mainly: (1) the cylinder head surfaces and other surfaces which are in contact with the hot, expanding combustion gases, (2) non-translational molecular energy states activated at higher temperatures of the combustion gases, and (3) molecular dissociation of the combustion gases. In contrast, reduced burn rate lowers the average effective compression ratio at which heat is added to the combustion gases.) The overall improvement in thermal efficiency can, however, be secured without any offsetting degradation of engine mechanical efficiency. This superior approach requires that brake torque not decrease, or in other words, that the increment of added EGR be obtained with no decrease in injection pulse width. This is of course the second of the two original alternatives for minimizing BSFC, but only the less effective of the two is available once the engine 10 has reached an effectively-wide-open position of its throttle 12.

It is now clear that the part-throttle calibration technique for the engine 10 pits burn rate against the three benefits of reduced combustion temperature in combination with a very slight reduction of air pumping loss. An alternative part-throttle calibration technique is obviously somewhat less efficient because it is closely related to the less desirable of the two BSFC minimization techniques that have just been considered. More specifically, the position of the EGR valve would still be varied in search of minimum BSFC, but with a concurrent change in pulse width and no concurrent change in throttle position. This variation would allow both spark timing and the schedule of EGR valve position to be determined as functions of throttle position and crankshaft speed.

Another variation of the present invention again relates to the two part-throttle BSFC minimization techniques. The naturally-aspirated engine 10 could probably, like the supercharged engine 51, utilize a higher compression ratio if the wide-open-throttle schedule of fuel injection pulse width were limited by the constant pulse width values for which BSFC is exactly minimized as the throttle 12 first reaches an effectively wide open position. Nevertheless, any resulting increase in compression ratio is balanced against disadvantages associated with the greater piston displacement needed to offset the considerable attendant loss in brake torque. (The EGR interrupt device 94 in FIG. 6 would also have to be eliminated to allow a higher compression ratio.) In the case of naturally-aspirated engines, compression ratio usually is already high enough that not having to increase piston displacement is a much greater advantage. Moreover, the EGR interrupt device 94 is rarely practical on highly-boosted supercharged engines, so the penalty in piston displacement is not nearly as great.

In the following claims, the term "Otto cycle engine" has an established definition that is functional. In other words, any new device, no matter how different structurally from all previous types of Otto engines, will be classified as being an Otto engine if it meets the established requirements of function. This is clear from the wide structural diversity of Otto engines that exist already, as is illustrated by comparing conventional reciprocating engines to the Wankel rotary engine. More importantly, the scope of any patent claim encompassing an Otto engine as an element in a novel combination with other known elements would include the case of a new Otto engine invented after the issuance of the patent claim.

Unfortunately, there are no established functional definitions suitable for other major elements in the following claims. Accordingly, the following claims often make their own definitions by specifying what functions the named element is operative to perform. Novelty resides in the combination of elements, and within individual elements as well.

What is claimed is:

1. Apparatus for improving the efficiency with which mechanical power is produced for delivery to a load by an Otto cycle engine which consumes only an intake charge comprising air and fuel in stoichiometric proportion thereto to thereby produce the power for delivery to the load, the engine having at least one combustion chamber and said fuel and said air at least beginning to merge before entering each of said at least one combustion chamber, a power output shaft of the engine providing the power produced for delivery to the load and having an overall range of rotational speed consisting of all values of rotational speed with which said output shaft provides the power produced for delivery to the load, the apparatus comprising:

a designated induction-and-fuel-metering system for the engine selected from a naturally-aspirated induction-and-fuel-metering system and a supercharged induction-and-fuel-metering system, said naturally-aspirated induction-and-fuel-metering system comprising a throttle valve device and a first intake mixture preparation means, said throttle valve device being interposed in a flow comprising substantially all of said engine intake air to thereby provide control of the power produced for delivery to the load, said throttle valve device having an actually wide open position which minimizes density reduction of said intake air caused by thermodynamic free expansion in said flow of intake air as said intake air passes through said throttle valve device, said minimization of density reduction occurring when said engine output shaft speed is maximized in said overall speed range of said engine output shaft, said throttle valve device being effectively wide open whenever said flow of engine intake air is substantially free of density reduction of said intake air caused by thermodynamic free expansion in said flow of intake air as said intake air passes through said throttle valve device, and said throttle valve device also being effectively wide open whenever said throttle valve device is substantially in said actually wide open position, said first intake mixture preparation means having an efficient wide-open-throttle calibration for automatically providing full dilution of the intake charge when said throttle valve device is effectively wide open, said wide-open-throttle calibration extending substantially throughout an efficient rotational speed range of said engine output shaft which is at least 50% as wide as said overall engine speed range when each of said efficient and said overall engine speed ranges is expressed as a positive range of revolutions per minute, the intake charge consisting of said full intake charge dilution and said stoichiometric portion of the intake charge at substantially all times when said first intake mixture preparation means is implementing said wide-open-throttle calibration, with said engine output shaft operating at each particular speed value within asid efficient engine speed range said full intake charge dilution both having a particular composition and being in a weight proportion to said stoichiometric portion which substantially minimizes brake specific cost of operating the engine with (a) said engine output shaft operating at said particular speed value, (b) said throttle valve device being effectively wide open, (c) ambient air density being representative of anticipated operating conditions for the engine and (d) the intake charge consisting of said stoichiometric portion and dilution of said particular composition, said brake specific cost of engine operation being chosen to optimize operation of the engine and comprising mass amount of said fuel consumed by the engine to produce one brake-horsepower-hour of mechanical energy at said engine output shaft, and said supercharged induction-and-fuel-metering system comprising said throttle valve device, a supercharger for the engine and a second intake mixture preparation means, said second intake mixture preparation means having an efficient full-boost-pressure calibration for automatically providing full-boost dilution of the intake charge when said supercharger is providing full boost pressure to the engine, said full-boost-pressure calibration extending substantially throughout said efficient engine speed range and the intake charge consisting of said full-boost intake charge dilution and said stoichiometric portion of the intake charge at substantially all times when said second intake mixture preparation means is implementing said full-boost-pressure calibration, with said engine output shaft operating at each constant speed value within said efficient engine speed range said full-boost dilution of the intake charge having a specific composition and being in at least that weight proportion to said stoichiometric portion which substantially minimizes said brake specific cost of operating the engine with (a) said engine output shaft operating at said constant speed value, (b) said supercharger providing full boost pressure to the engine, (c) ambient air density being representative of anticipated operating conditions for the engine and (d) the intake charge consisting of said stoichiometric portion and dilution of said specific composition, the engine having air flow control means which comprises said throttle valve device and is operative to regulate mass consumption rate by the engine of said flow of engine intake air to thereby in turn regulate, throughout a continuous range which includes zero, brake torque produced by said engine output shaft at each fixed value of said engine output shaft speed throughout said efficient engine speed range, said designated induction-and-fuel-metering system being calibrated to automatically regulate mass consumption rate of said fuel by the engine to a magnitude which depends upon both said engine output shaft speed and status of said air flow control means, said automatic regulation of fuel consumption comprising said wide-open-throttle calibration if the apparatus includes said naturally-aspirated induction-and-fuel-metering system and said automatic regulation of fuel consumption comprising said full-boost-pressure calibration if the apparatus includes said supercharged induction-and-fuel-metering system, said automatic regulation of fuel consumption having associated therewith a topographical surface mapping of said brake specific cost of engine operation onto an area of power produced at said engine output shaft versus said engine output shaft speed, discrete-ratio means which couples said engine output shaft to the load through a total number of discrete speed ratios at least equal to two, each of said total number of speed ratios being expressed as a dimensionless ratio of said engine output shaft speed to a concurrent rotational speed of the load obtained with zero power loss due to slippage between the engine and the load, a best choice shift schedule associating a single best ratio selected from said total number of speed ratios to each individual load combination included in all achievable load combinations of said rotational speed of the load and the power produced for delivery to the load, each one of said all achievable load combinations having associated therewith candidate engine speeds obtained only by multiplying each one of said total number of speed ratios by a value of said rotational load speed taken from said one of said all achievable load combinations, each individual candidate engine speed included in all those candidate engine speeds both obtained from said individual load combination and existing within said overall engine speed range having associated therewith a candidate brake specific cost obtained only from said engine mapping of brake specific cost at a point on said mapping located by (a) magnitude on said engine mapping of said power produced by the engine at said engine output shaft being equal to a value of the power produced for delivery to the load given by said individual load combination and (b) magnitude on said engine mapping of said engine output shaft speed being equal to said individual candidate engine speed, said candidate brake specific cost associated with said individual candidate engine speed being infinite if said point falls outside of said engine mapping as determined by actual power-producing capability of the engine, a best candidate brake specific cost having a magnitude at least as low as that of any other candidate brake specific cost selected from all candidate brake specific costs associated with said individual load combination, said single best ratio associated with said individual load combination by said best choice shift schedule being that ratio which secures a candidate engine speed which in turn secures said best candidate brake specific cost, and when all candidate brake specific costs obtained for said individual load combination are infinite said best ratio having a candidate engine speed higher than any other candidate engine speed both within said overall engine speed range and associated with said individual load combination, and ratio control means operative to select both upshifts and downshifts between speed ratios in said total number of speed ratios in substantial accordance with said best choice shift schedule, said substantial accordance being from the standpoint of a cost rate mathematically integrated over a time period during which the power produced for delivery to the load and said rotational speed of the load pass through a broad range of combinations representative of an operational lifetime anticipated to be common for the engine, said cost rate consisting of current magnitude of said brake specific cost of engine operation multiplied by current magnitude of the power produced for delivery to the load, whereby an engine calibration selected from said wide-open-throttle calibration and said full-boost-pressure calibration enhances operating efficiency of the engine and said ratio control means selects speed ratios compatible with efficient operation of the engine.

2. The apparatus of claim 1 further comprising (a) input means operative to command a varying desired level for the power produced for delivery to the load, said commanded level of power having a discrete current value and (b) engine control means operative to adjust said status of said air flow control means to thereby substantially equalize current magnitude of said power produced at said engine output shaft to said current value of commanded power, said engine control means being operative to change said status of said air flow control means to maintain said power equalization when said engine output shaft speed changes while said commanded power level remains constant, including change in said engine output shaft speed caused by upshifts and downshifts between ratios in said total number of speed ratios, whereby relatively wide ratio spacing in said total number of speed ratio neither leads to oscillating shifting of said discrete-ratio means or compromises selection by said ratio control means of speed ratios compatible with efficient operation of the engine.

3. Apparatus for improving the efficiency with which a combustion engine produces power for delivery to a load, the engine having combustion charge preparation means operative to automatically regulate fuel consumed by the engine to a mass flow rate dependent upon both operating speed of the engine and status of means operative to regulate brake torque produced by the engine, said automatic regulation of engine fuel consumption having associated therewith a topographical surface mapping of brake specific cost of operating the engine onto an area of said engine brake torque versus said engine operating speed, said mapping including a CVT engine operating schedule which relates both a specific value of said engine brake torque and a specific value of said engine operating speed to a specific level of the power produced for delivery to the load, said relation of specific values of engine torque and speed existing for all values assumed by said specific power level within said CVT engine operating schedule, said brake specific cost being chosen to optimize operation of the engine and comprising mass amount of said fuel consumed by the engine to produce one brake-horsepower-hour of mechanical energy for delivery to the load, and said brake specific cost being minimized for said specific level of power when said specific values are attained by said engine brake torque and said engine operating speed, said minimization of brake specific cost existing for all values assumed by said specific level of power within said CVT engine operating schedule, said CVT engine operating schedule restricting said engine brake torque to a particular function of said engine operating speed which includes both a maximum torque and a torque plateau which remains above 75% of said maximum torque substantially throughout an efficient range of said engine operating speed, said efficient range being at least 50% as wide as an overall speed range that consists of all values of said engine operating speed with which the engine produces the power for delivery to the load, each of said overall and said efficient engine speed ranges being expressed as a positive range of revolutions per minute to yield said value of at least 50%, the apparatus being characterized by fuel economy improvement which is a significant portion of that afforded by utilizing an efficient continuously variable transmission with a particular overall range of speed ratio to follow said CVT engine operating schedule of minimized brake specific cost, the apparatus comprising:

a discrete-ratio gearbox which couples the engine to the load through a total number of discrete speed ratios at least equal to two, all of said total number of gearbox ratios together providing an overall range of speed ratio equal to said particular range of speed ratio, and a first of said total number of gearbox ratios being greater than a second of said total number of gearbox ratios multiplied by 1.2, said first gearbox ratio being numerically closer to said second gearbox ratio than any other of said total number of gearbox ratios, and drive-by-wire control means comprising (a) input means operative to command a varying desired level for the power produced for delivery to the load, said commanded power level having a discrete current value, (b) engine control means operative to change said status of said engine torque-regulating means to thereby substantially equalize current magnitude of the power produced for delivery to the load to said current value of commanded power, said engine control means being operative to change said status of said engine torque-regualting means to maintain said power equalization when said engine operating speed changes while said commanded power level remains constant, including change in said engine operating speed caused by both upshifts and downshifts between ratios in said total number of gearbox ratios and (c) gearbox ratio selector means operatie to select said upshifts and downshifts according to an operational mapping of said total number of gearbox ratios onto an area of said commanded level for the power produced for delivery to the load versus a rotational operating speed of the load, said operational mapping of gearbox ratio substantially duplicating a best choice mapping of gearbox ratio which is a complete mapping and which deviates from said minimization of brake specific cost achieved by said CVT engine operating schedule by less than any other one of complete mappings constructed on said area of commanded power versus load speed using said total number of gearbox ratios, each of said complete mappings applying to all achievable values of said commanded power level as combined with all achievable values of said rotationl load speed to thereby establish continuity in the power produced for delivery to the load across those of said upshifts initiated at less than a certain value of said engine operating speed placed high in said overall engine operating speed range and across those of said downshifts completed at less than said highly placed engine operating speed, said substantial duplication of said best choice mapping of gearbox ratio by said operational mapping being from the standpoint of a cost rate mathematically integrated over a time period during which the power produced for delivery to the load and said rotational speed of the load pass through a broad range of combinations representative of an operational lifetime anticipated to be common for the engine, said cost rate consisting of current magnitude of said brake specific cost of engine operation multiplied by current magnitude of the power produced for delivery to the load, whereby reduction in said brake specific cost of operating the engine is uncompromised by the combination of (a) said engine torque plateau, (b) relatively wide spacing of ratios among said total number of gearbox ratios and (c) said continuity in power across upshifts and downshifts.

4. The apparatus of claim 3 wherein the load consists of that imposed by traction wheels of a vehicle powered by the engine and wherein said total number of gearbox ratios is at least four, whereby said overall range of speed ratio provided by said total number of gearbox ratios is wide enough to more nearly optimize the fuel economy of said vehicle.

5. The apparatus of claim 4 wherein said gearbox ratio selector means is further operative to execute said upshifts and downshifts selected by said gearbox ratio selector means, whereby said operational mapping of gearbox ratios is implemented automatically.

6. The apparatus of claim 3 wherein (a) said gearbox is a powershift gearbox, (b) said gearbox ratio selector means is further operative to execute said upshifts and downshifts selected by said gearbox ratio selector means and (c) the apparatus further comprises clutch means selected from fluid couplings and torque converters and interposed between the engine and said gearbox, whereby operation of said gearbox according to said operational mapping of gearbox ratios is fully automatic.

7. The apparatus of claim 3 wherein the engine is a naturally-aspirated Otto cycle engine which consumes only an intake charge comprising air and said fuel in stoichiometric proportion thereto to thereby produce the power for delivery to the load, the engine having at least one combustion chamber and said fuel and said air at least beginning to merge before entering each of said at least one combustion chamber, and wherein said engine torque-regulating means comprises a throttle valve device interposed in a flow comprising substantially all of said intake air consumed by the engine, said throttle valve device having an actually wide open position which minimizes reduction in density of said intake air caused by thermodynamic free expansion in said flow of intake air as said intake air passes through said throttle valve device, said minimization of density reduction occurring when said engine operating speed is maximized within said overall engine operating speed range, said throttle valve device being effectively wide open whenever said flow of intake air is substantially free of reduction in density of said intake air caused by thermodynamic free expansion in said flow of intake air as said intake air passes through said throttle valve device, and said throttle valve device also being effectively wide open whenever said throttle valve device is substantially in said actually wide open position, said minimization of brake specific cost by said CVT engine operating schedule being obtained with said throttle valve device remaining effectively wide open substantially throughout said efficient engine operating speed range, whereby density of combustion gases in the engine is maximized to thereby improve engine operating efficiency along said torque plateau of said CVT engine operating schedule.

8. The apparatus of claim 7 wherein said combustion charge preparation means has an efficient WOT calibration which automatically provides WOT dilution of said intake charge when said throttle valve device in effectively wide open, said WOT calibration extending substantially throughout said efficient engine operating speed range, and said intake charge consisting of said WOT charge dilution and said stoichiometric portion of said intake charge whenever said charge preparation means is implementing said WOT calibration, with the engine operating at a particular speed within said efficient engine speed range said WOT charge dilution both having a particular composition and being in a weight proportion to said stoichiometric portion which substantially minimizes said brake specific cost of operating the engine with (a) said throttle valve device effectively wide open, (b) the engine operating at said particular speed, (c) ambient air density being representative of anticipated operating conditions for the engine and (d) said intake charge consisting of said stoichiometric portion and charge dilution of said particular composition, said minimization of brake specific cost by said WOT charge dilution extending substantially throughout all values of said particular engine speed selected from said efficient engine speed range, and said automatic regulation of engine fuel consumption by said combustion charge preparation means comprising said WOT calibration, whereby said WOT calibration optimizes said torque plateau of said CVT engine operating schedule.

9. The apparatus of claim 8 wherein said WOT charge dilution comprises recirculated exhaust gas and wherein said engine torque-regulating means further comprises means operative to regulate consumption by the engine of said recirculated exhaust gas, whereby said recirculated exhaust gas reduces engine exhaust emissions of nitrogen oxides.

10. The apparatus of claim 3 wherein the engine is an Otto cycle engine which incorporation a supercharger and which consumes only an intake charge comprising air and said fuel in stoichiometric proportion thereto to thereby produce the power for delivery to the load, the engine having at least one combustion chamber and said fuel and said air at least beginning to merge before entering each of said at least one combustion chamber, and wherein said engine torque-regulating means comprises a throttle valve device interposed in a flow comprising substantially all of said intake air consumed by the engine, said minimization of brake specific cost by said CVT engine operating schedule being obtained with said supercharger providing full boost pressure to the engine substantially throughout said efficient engine operating speed range, whereby density of combustion gases in the engine is maximized to thereby improve engine operating efficiency along said torque plateau of said CVT engine operating schedule.

11. The apparatus of claim 10 wherein said combustion charge preparation means has an efficient full-boost-pressure calibration which automatically provides full-boost dilution of said intake charge when said supercharger is providing full boost pressure to the engine, said full-boost-pressure calibration extending substantially throughout said efficient engine operating speed range, and said intake charge consisting of said full-boost dilution and said stoichiometric portion of said intake charge whenever said charge preparation means is implementing said full-boost-pressure calibration, with the engine operating at each fixed speed within said efficient engine speed range said full-boost dilution both having a particular composition and being in at least that weight proportion to said stoichiometric portion which substantially minimizes said brake specific cost of operating the engine with (a) said supercharger providing full boost pressure to the engine, (b) the engine operating at said fixed speed, (c) ambient air density being representative of anticipated operating conditions for the engine and (d) said intake charge consisting of said stoichiometric portion and charge dilution of said particular composition, and said automatic regulation of engine fuel consumption by said combustion charge preparation means comprising said full-boost-pressure calibration, whereby said full-boost-pressure calibration optimizes said torque plateau of said CVT engine operating schedule.

12. The apparatus of claim 3 wherein said brake specific cost comprises mass amount of said fuel consumed by the engine to provide one brake-horsepower-hour of mechanical energy for delivery to the load added to a product of an emissions weighting factor and total mass amount of a chemical species emitted in the exhaust gas of the engine while the engine produces one brake-horsepower-hour of mechanical energy for delivery to the load, said emissions weighting factor being chosen to achieve a desirable tradeoff between fuel efficiency of the engine and exhaust emission from the engine of said chemical species.

* * * * *